United States Patent
Prater

(10) Patent No.: US 11,982,621 B2
(45) Date of Patent: May 14, 2024

(54) AUTOFLUORESCENCE PHOTOTHERMAL CHARACTERIZATION SYSTEMS AND METHODS

(71) Applicant: Photothermal Spectroscopy Corp., Santa Barbara, CA (US)

(72) Inventor: Craig Prater, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 0 days.

(21) Appl. No.: 17/937,447

(22) Filed: Oct. 1, 2022

(65) Prior Publication Data

US 2024/0118208 A1 Apr. 11, 2024

(51) Int. Cl.
*G01N 21/64* (2006.01)

(52) U.S. Cl.
CPC ..... *G01N 21/6456* (2013.01); *G01N 21/6486* (2013.01); *G01N 2201/062* (2013.01); *G01N 2201/0636* (2013.01)

(58) Field of Classification Search
CPC ........... G01N 21/6456; G01N 21/6486; G01N 2201/062; G01N 2201/0636
See application file for complete search history.

(56) References Cited

U.S. PATENT DOCUMENTS

| | | | |
|---|---|---|---|
| 9,603,210 B1 | 3/2017 | Carlen | |
| 10,677,722 B2 | 6/2020 | Li et al. | |
| 2012/0167261 A1* | 6/2012 | Belkin | G01Q 20/02 850/56 |
| 2019/0120753 A1* | 4/2019 | Prater | G01N 21/59 |
| 2019/0302437 A1* | 10/2019 | Hillman | G02B 21/0032 |
| 2019/0317012 A1* | 10/2019 | Furstenberg | G01N 21/1717 |
| 2020/0061612 A1 | 2/2020 | Dimov | |
| 2020/0378829 A1 | 12/2020 | Decker et al. | |
| 2021/0003504 A1 | 1/2021 | Li et al. | |
| 2021/0164894 A1* | 6/2021 | Prater | G01N 21/35 |
| 2022/0018773 A1 | 1/2022 | Prater | |
| 2022/0065772 A1 | 3/2022 | Prater | |

FOREIGN PATENT DOCUMENTS

| | | |
|---|---|---|
| WO | 2012039679 A2 | 3/2012 |
| WO | 2020123497 A1 | 6/2020 |

OTHER PUBLICATIONS

Razumtcev et al. "Parts-per-Million Detection of Trace Crystal Forms Using AF-PTIR Microscopy," Analytical Chemistry, American Chemical Society Publications, Sep. 13, 2022.
"Autofluorescence spectroscopy and imaging: a tool for biomedical research and diagnosis," by AC Croce and G. Bottiroli, European Journal of Histochemistry 2014; vol. 58:2461.
Jensen, "Use of Fluorescent Probes: Their Effect on Cell Biology and Limitations," 295 AR Insights 12 (Oct. 12, 2012).

(Continued)

*Primary Examiner* — Marcus H Taningco
(74) *Attorney, Agent, or Firm* — Merchant and Gould, P.C.

(57) ABSTRACT

Methods and systems described herein detect autofluorescence of a sample. These methods and systems obviate the need for addition of fluorophores to samples to create IR absorption.

27 Claims, 14 Drawing Sheets

(56) References Cited

OTHER PUBLICATIONS

"Application of Temperature-Dependent Fluorescent Dyes to the Measurement of Millimeter Wave Absorption in Water Applied to Biomedical Experiments" by Kuzkova et al. in the International Journal of Biomedical Imaging in Nov. 2014.

"Temperature measurement in the microscopic regime: a comparison between fluorescence lifetime- and intensity-pased methods" by C. Paviolo et al., in the Journal of Microscopy, Mar. 22, 2013.

Renz, "Fluorescence Microscopy—A historical and Technical Perspective," Cytometry Part A, vol. 83, pp. 767-779 (2013).

Sanderson et ak, "Fluorescence Microscopy," Cold Spring Harb Protoc. 2014(10): pdb.top071795. doi:10.1101/pdb.top071795.

Y. Bai, J. Yin, J-X. Cheng, Bond-selective imaging by optically sensing the mid-infrared photothermal effect. Sci. Adv. 7, eabg1449 (2021).

"Mid-infrared photothermal single-life-cell imaging beyond video rate," by Genki Ishigane et al., Institute for Photon Science and Technology, The University of Tokyo, Japan, 2022.

"Photo-Thermal Spectroscopic Imaging of MEMS Structures with Sub-Micron Spatial Resolution" Robet Furstenberg et al., U.S. Naval Research Laboratory, Dec. 1, 2011.

International Search Report and Written Opinion, Application No. PCT/US23/75352, mailed Feb. 16, 2024, 14 pages.

\* cited by examiner

AUTOFLUORESCENCE PHOTOTHERMAL CHARACTERIZATION SYSTEMS AND METHODS

TECHNICAL FIELD

Embodiments disclosed herein generally relate to investigating or analyzing materials using optical systems, such as by using infrared, visible, or ultraviolet light. Embodiments described herein relate to imaging and spectroscopy, and, more particularly, to enhancements to photothermal imaging and spectroscopy systems and techniques for acquiring spectral information indicative of the optical properties and/or material or chemical composition of a sample, for example, information that correlates to an infrared (IR) absorption spectrum in combination with simultaneous collocated fluorescence imaging.

BACKGROUND

Infrared (IR) spectroscopy is a powerful technique for chemical characterization and analysis of materials, including the mapping and identification of chemical species in complex environments, for example biological materials. Infrared spectroscopy operates by illuminating a sample with a beam of infrared radiation and then measuring the amount of light absorbed, transmitted, reflected and/or scattered from the sample. The frequencies of infrared light, especially mid-infrared light (2.5-20 μm in wavelength) correspond to vibrational frequencies in molecular bonds. Thus, when a sample is illuminated by mid-IR light, it will absorb light at IR radiation frequencies corresponding to specific molecular vibration of chemical species in the sample. By measuring the absorption of IR light by a sample as a function of IR frequency (i.e., an IR absorption spectrum) the pattern of absorption peaks provides a "fingerprint" that can be used to characterize and/or identify chemical species in the sample.

Optical Photothermal Infrared (OPTIR) spectroscopy is an emerging field that provides chemical analysis using infrared spectroscopy with a spatial resolution ten or more times finer than conventional Fourier Transform Infrared (FTIR) spectroscopy. OPTIR achieves higher spatial resolution than conventional IR spectroscopy by using a shorter wavelength "probe beam" to sense photothermal distortions in infrared absorbing regions of the sample. Various OPTIR techniques are described, for example, in U.S. Pat. Nos. 9,091,594, 9,841,324, and 10,677,722, 11,002,665, 10,942,116, and 10,809,184, each of which are incorporated herein by reference in their entireties.

Confocal fluorescence microscopy is a laser-based technique where radiation of one wavelength excites a fluorescent response in a sample that is detected at second wavelength or range of wavelengths. Extensive libraries of fluorescent dyes have been developed to target different functional and structural elements of biological materials, for example cells, tissues, and organisms. Fluorescence microscopy enables researchers and clinicians to create, visualize and analyze micrographs of a sample where each color represents the distribution of specific target structures within the biological material. Various fluorescence microscopy techniques are described, for example in Renz, "Fluorescence Microscopy—A historical and Technical Perspective," Cytometry Part A, Vol 83, pp. 767-779 (2013) and Sanderson et al., "Fluorescence Microscopy," Cold Spring Harb Protoc. 2014(10): pdb.top071795. doi:10.1101/pdb.top071795.

SUMMARY

According to embodiments described herein, a method for performing infrared imaging of a sample includes illuminating a first region of the sample with an infrared source that generates a modulated infrared beam, illuminating the sample with a beam of excitation radiation to excite autofluorescent emission in a second region at least partially overlapping the first region, detecting at least a portion of the autofluorescent emission from the second region by at least one array-based detector as detected autofluorescent emission, producing a first frame autofluorescent dataset of the second region using the detected autofluorescent emission of the sample with a first value of infrared beam energy, producing a second frame autofluorescent dataset of the second region using the detected autofluorescent emission at a second value of infrared beam energy; and constructing an output indicative of infrared absorption of the sample using the first frame autofluorescent dataset and the second frame autofluorescent dataset.

The target class can include any or all of NAD(P)H bound, NAD(P)H free, fatty acids, vitamins, flavins, proteins, porphyrins, and chlorophyll, for example. Filtering the light can include substantially maximizing transmission of a peak amplitude of an autofluorescent emission spectrum of the sample, or substantially maximizing the transmission of a peak amplitude of an autofluorescent emission spectrum of the sample comprises using a band pass filter substantially aligned to the center of a local autofluorescent emission peak of a substance within the sample. Filtering the light may also include transmitting light at a wavelength where autofluorescent emissions from a first substance within the sample are substantially larger than autofluorescent emissions from a second substance within the sample, and wherein the wavelength at which the light is transmitted is not a local peak amplitude of an autofluorescent emission spectrum of the first substance.

In any of these embodiments, the output may be indicative of infrared absorption of the sample in an area overlapping the first region and the second region.

The first dataset and the second dataset each separately comprise an image, an array, or another mapping of absorption or autofluorescent emission to location on the sample.

According to another embodiment, an apparatus for performing infrared imaging of a sample includes an excitation radiation source configured to illuminate a region of the sample with a beam of excitation radiation to excite autofluorescent emission in the sample; a modulated infrared source configured to illuminate the region of the sample with a modulated infrared beam to create an infrared illuminated region of the sample; at least one array-based detector configured to capture at least a portion of the autofluorescent emission from the infrared illuminated region of the sample and produce a first frame autofluorescent image of the region of the sample with a first value of infrared beam energy and produce a second frame autofluorescent image of the infrared illuminated region of the sample at a second value of infrared beam energy; and a processor configured to construct a signal indicative of infrared absorption of the region of the sample using the first and second frame autofluorescent images.

The apparatus can also include a stage configured to hold the sample, in some embodiments. The stage may be movable relative to at least one of the beam of infrared illumination and the beam of excitation radiation.

The modulated infrared source may be a pulsed infrared source configured to generate the modulated infrared beam. The modulated infrared source may be a continuous wave source paired with a chopper to generate the modulated infrared beam The excitation radiation source may be modulated, rather than pulsed, in some embodiments.

The apparatus may have at least one pulse generator operationally coupled to the modulated infrared source and the modulated radiation source, wherein the at least one pulse generator is configured to control the timing of the modulated infrared source and the excitation radiation source at an adjustable delay.

The processor may be configured to construct the signal indicative of infrared absorption of the region by controlling the detector to obtain the first frame autofluorescent image and the second frame autofluorescent image based upon the controlled timing of the modulated infrared source and the modulated radiation source.

The apparatus may further include an infrared objective configured to receive the modulated infrared beam and focus it on the region of the sample.

The apparatus may further include an excitation beam objective configured to receive the modulated beam of excitation radiation and focus it on the region of the sample, and further configured to receive the autofluorescent emission from the sample and route the received autofluorescent emission towards the camera-based detector.

The apparatus may further include a dichroic mirror arranged between the excitation beam objective and the camera-based detector, wherein the dichroic mirror is selected to reflect a majority of light having a wavelength of the excitation radiation; and transmit a majority of light having a wavelength of the autofluorescent emissions.

The apparatus may include an autofluorescence filter arranged between the excitation beam objective and the camera-based detector.

The autofluorescence filter may be a long-pass filter.

The processor may be configured to construct the signal indicative of infrared absorption of the region by detecting fluorescence at a variety of wavelengths each corresponding to a respective autofluorescent wavelength of a substance.

The at least one of the first or second value of infrared beam energy may be substantially zero, or alternatively one of the first and second values may be less than the other. The excitation source can be one or more light emitting diodes, which may be pulsed. The at least one array-based detector may be configured to detect an autofluorescent response of chlorophyll or another biological substance that converts light to energy.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 4A shows IR absorption at 1660 cm$^{-1}$ while FIG. 4B shows absorption with the IR beam tuned to 900 cm$^{-1}$ of the same sample.

Figure 1A:
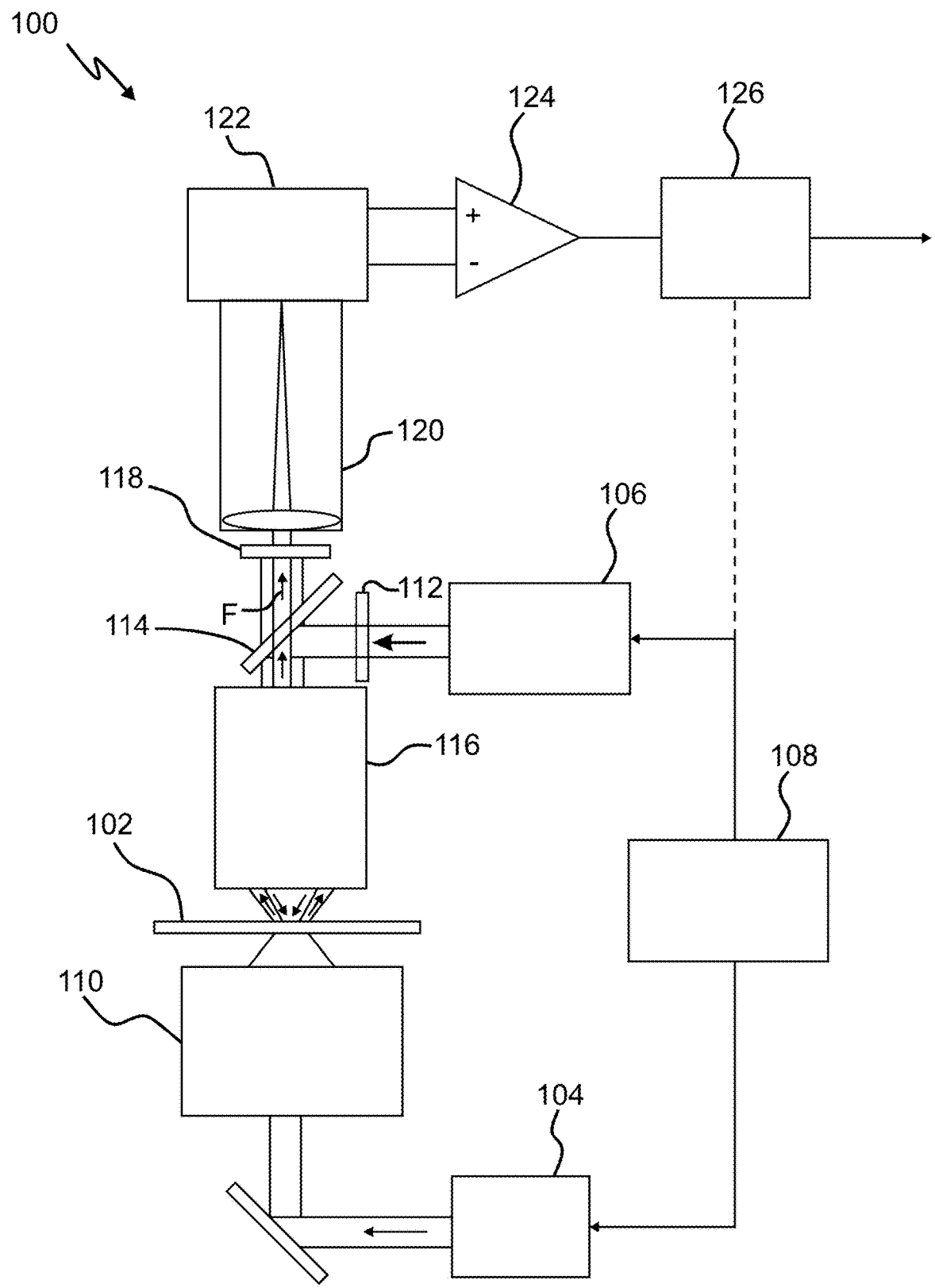
FIG. 1A is a conceptual, simplified block diagram of a microscope system for detecting fluorescent response to an applied excitation beam and IR beam according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION DEFINITIONS

For purposes of this specification, the following terms are specifically defined as follows:

An "analyzer/controller" refers to a system to facilitate data acquisition and control of an autofluorescent photothermal infrared (AF-PTIR) system. The analyzer/controller may be a single integrated electronic enclosure or may comprise multiple distributed elements. The control elements may provide control for positioning and/or scanning of the fiber probe and/or sample. They may also collect data about the probe beam deflection, motion or other response, provide control over the excitation and/or probe power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs may be implemented along with discrete circuit components to carry out one or more of the processes described herein.

"Beam combiner" means an optical element that can combine two beams onto the same optical path. A dichroic mirror or filter for example can be used as a beam combiner where the dichroic can be configured to transmit one or more wavelength range and reflect one or more other wavelength ranges. Two beams arranged for example at right angles incident on the dichroic can then combine two beams onto the same path. In one configuration, a beam combiner may be a beam splitter used in a reverse direction, i.e., combining one beam that reflects off the beam splitter interface with another beam that is transmitted through the beam splitter interface. A beam splitter cube, for example, can be used as both a beam splitter and a beam combiner. Optical elements that are marketed as beam splitters can be used as a beam combiner, even if they are not used to split light onto two paths. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam combiner can also be an optical fiber-based device, for example combining the light from two input fibers into one output fiber, for example a 1×2 fiber coupler. A single 1×2 fiber coupler can be used as both a beam splitter and a beam combiner.

"Beam splitter" refers to an optical element that can divide light onto at least two paths. A beam splitter can comprise a plate, a cube and/or a prism or other shapes/configurations that can divide a beam of light. The beam splitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Nomarski or Wollaston prism. A beam splitter may also be non-polarizing, where light is divided between two paths without substantial dependence on the polarization of the incident light. A beam splitter can also be an optical fiber-based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another.

"Bleaching" refers to photobleaching, or the tendency of a sample to have decreasing fluorescent response to optical stimulation with increasing duration of exposure. Fluorophores can be damaged by exposure to light, especially at the excitation wavelengths that cause an autofluorescent response.

"Collecting probe light" and "collecting probe radiation" refer to collecting radiation of a probe light beam that has interacted with a sample. The probe light can be collected after reflection, scattering, transmission, evanescent wave coupling, and/or transmission through an aperture probe.

"Collimating optic" refers to any of the above optical elements arranged in a way to generally collimate radiation. In some embodiments the same optic(s) may serve as both a focusing optic and a collimating optic, for example focusing light in one direction of propagation and then recollimating the light in the opposite direction of propagation.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/radiation incident on the detector surface. The signal will generally be an electrical signal, for example a voltage, current and/or an electrical charge. The detector may be a photodiode, a phototransistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two-dimensional array of detector elements, including camera-based detectors. An "array-based detector" means a detector that can comprise multiple photosensitive elements, for example a linear array or 2D array of photosensitive elements, and/or a 1D or 2D array of photosensitive pixels. An array-based detector can be an optical detector comprising an array with a plurality of photosensitive elements, for example a linear array or 2D array of photodiodes, or a linear or 2D array of photosensitive pixels, for example in camera-based detectors. An array-based detector can be analog devices like a photodiode array and/or hybrid analog/digital devices like camera-based detectors. A "camera" or "camera-based detector" refers to a type of array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher.

"Diffraction limit" of a light beam means the minimum separation of two optical sources that can be distinguished by a detector. The Abbe diffraction limit d for a microscope having a numerical aperture NA and operating at a wavelength $\lambda$ is defined as $d=\lambda/(2\,NA)$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation. A demodulator may produce any of a series of signals including an amplitude and/or phase of modulation of the information bearing signal, and/or in-phase (X) or quadrature (Y) signals or any other desired signal indicative of a property of a change in the information-bearing signal.

A "demodulator" refers to a device or system that performs demodulation.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Focusing optic" refers to one or more optical elements with the ability to focus light. A focusing optic can comprise one or more refractive lenses, curved mirrors, diffractive optics, Fresnel lenses, volume hologram, metamaterial, or any combination thereof or any other device or component capable of focusing radiation.

"Fluorescence" refers to the emission of light from a sample at one wavelength due to excitation at another wavelength. Fluorescent excitation and emission processes are a form of inelastic scattering of incident light and can be used to characterize a sample by providing information about the types of fluorescent emissions (number of photons emitted, and wavelength of emitted photons) based on a particular intensity and spectrum of incident light. "Autofluorescence" refers to fluorescence that occurs naturally upon exposure of a sample to an excitation source, while fluorescence more broadly can refer either to autofluorescence or to exogenous fluorescence via the application/integration of external fluorophores like fluorescent dyes, fluorescent proteins, and fluorescent nanoparticles or other fluorescence treatments.

"Illuminate," "illuminating," and "illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting elements, focusing elements and any other beam steering or conditioning elements.

"Infrared absorption spectrum" refers to a spectrum that is indicative of the wavelength dependence of the infrared absorption coefficient, absorbance, or similar indication of IR absorption properties of a sample. An example of an infrared absorption spectrum is the absorption measurement produced by a Fourier Transform Infrared spectrometer (FTIR), i.e. an FTIR absorption spectrum. In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. It is noted that IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, CO2 lasers, microscopic heaters, electrically or chemically generated sparks, laser driven thermal light sources, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 cm 1 or <1 cm 1 less, or may be broadband, for example with a spectral width of >10 cm 1, >100 cm 1 or greater than 500 cm 1. Broadband sources can be made narrow band with filters, monochromators and other devices. The infrared source can also be made up of one of discrete emission lines, e.g. tuned to specific absorption bands of target species. IR sources with narrower wavelength can be coupled together to produce an IR source with a wider wavelength range, for example a QCL and an OPO, or multiple external cavity QCL modules, or even a large array of QCL emitters.

"Interacting" in the context of interacting with a sample means that light illuminating a sample is at least one of scattered, refracted, absorbed, aberrated, diverted, diffracted, transmitted, and reflected by, through and/or from the sample.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high-speed rotating mirror devices. Modulation can also be accomplished with devices that provide time varying transmission like acousto-optic modulators, electro-optic modulators, photo-elastic modulators, pockel cells, and the like, and more generally any electronically controllable device that can change the amplitude and/or optical phase of an incident light beam. Modulation can also be accomplished with diffraction effects, for example by diffractive MEMS-based modulators, or by high-speed shutters, attenuators, or other mechanisms that change the intensity, angle, and/or phase of the laser intensity incident on the sample. The modulation can for example comprise any form of periodic waveform, for example sinusoidal waves, square waves, pulses, triangle waves, chirps, etc. The modulation may be performed at a single modulation frequency or may be a composite of any number of desired frequency components. In some cases the modulation can also be aperiodic or comprise only single pulses. A "modulated source of radiation" is a source of radiation that comprises in some fashion the ability to modulate the optical power it delivers. A modulated source of radiation can be a source with the internal ability to pulse and/or modulate its power, a radiation source with an external trigger/modulation control, and/or a CW radiation source coupled with an external modulator, for example a mechanical chopper, an acousto-optical modulator or any of the other modulators described above or any other suitable mechanism for varying the power delivered by the radiation source. Note that in a modulated source of radiation, the radiation source and the modulator may be physically decoupled and there may be other optical elements like lenses, mirrors, filters, etc. between the radiation source and the modulator.

"Near infrared light" generally refers to a wavelength range of infrared (IR) light corresponding to 0.75-2 μm.

A "narrowband light source" a light source with a narrow bandwidth or linewidth, for example a light of linewidth smaller than 8 cm-1, but in general it can be a light source with a linewidth narrow enough that the linewidth does not cover a spectral range of interest of the sample.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with illuminating radiation.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

An "excitation source," "excitation light source," or "excitation radiation source" refers to a light source that can be used for causing a sample to fluoresce. Such light sources can be used to probe the response of the sample to the incidence of light from the infrared light source. The excitation source may comprise a gas laser, a laser diode, a diode pumped solid state laser, a supercontinuum laser, an optical parametric oscillator, a superluminescent diode (SLD), a near infrared laser, a UV and/or visible laser beam generated via sum frequency or difference frequency generation, for example. In some embodiments, the probe light source may operate at a wavelength that is outside the tuning or emission range of the infrared light source, but the probe light source can also be a fixed wavelength source at a select wavelength that does in fact overlap with the tuning range of the infrared light source. A "probe light beam" or "sensing light beam" is a beam originally emitted from a probe light source. An "autofluorescence excitation source," "autofluorescence excitation light source," or "autofluorescence excitation radiation source" is an excitation source configured to excite autofluorescent emission from the sample.

A "retarder" refers to an optical element that induces a relative optical phase delay in an optical path. Examples of retarders are wave plates, for example half wave plates, quarter wave plates and eight wave plates. One or more retarders/wave plates can be used to introduce an optical phase difference between two polarizations of light, for example to introduce a phase difference between two paths of a quadrature interferometer.

"Signal indicative of" refers to a signal that is mathematically related to a property of interest. The signal may be an analog signal, a digital signal, and/or one or more numbers stored in a computer or other digital electronic device. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

"Spectrum" refers to a measurement of one or more properties of a sample as a function of wavelength or equivalently (and more commonly) as a function of wavenumber.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Fluorescent Enhanced IR Spectroscopy with Simultaneous Confocal Fluorescence Imaging Applicant's previous work has demonstrated that fluorescence-enhanced IR spectroscopy with simultaneous confocal fluorescence imaging can be useful to obtain high sensitivity and high spatial resolution measurements of IR absorption with simultaneous confocal fluorescence imaging.

For example, Applicant's previously-filed patent application related to fluorescence-enhanced photothermal (FE-PTIR) spectroscopy, published as WO 2022/020356, is incorporated by reference in its entirety herein. As described in that reference, samples can be labeled with fluorescent dyes and/or tags to increase the measurable response to an excitation beam. As further described within that reference, while there may be portions of some samples that exhibit autofluorescence, it is the emission efficiency of temperature-dependent fluorescent dyes that creates significant changes in measured fluorescent intensity with IR heating. Dyes were discussed therein that increased thermal sensitivity by about two orders of magnitude over what was thought to be possible using autofluorescence alone.

The FE-PTIR approach described in WO 2022/020356 involves a novel method of detecting infrared absorption using the temperature dependence of the emission efficiency of fluorescent light as a reporter for infrared absorption by a sample. Specifically, the FE-PTIR approach illuminates a sample with two beams, an excitation beam to excite fluorescent emission from the sample and an infrared beam to excite molecular vibrations within the sample. When a sample is illuminated with infrared light at a wavelength corresponding to molecular vibrations within the sample, the absorbed IR light will cause local heating that changes the emission efficiency of the fluorescent.

Throughout this disclosure, a "portion" of the sample is referred to as being illuminated. It should be understood that the portion under discussion could refer to being the scope of an area imaged, or to a portion of light within the imaged area. The portion can be determined by changing either the position of the sample, or the position of the light sources or detectors used, in various embodiments. Furthermore, not all light need be collected from a sample: for example, a sample that is illuminated across a square cross-section may only be imaged across a circular area that fits within the square; this is still within the meaning of detecting light "from a portion" of the sample, even though the "portion" of the sample that is illuminated is somewhat larger or differently shaped than the portion from which the light is collected. The same is true in the inverse: excitation light may be directed to the entire sample, even though infrared light is directed to a smaller portion.

Thus the IR absorption by the sample can be inferred by observing changes in fluorescent emission from the sample in response to pulses of IR radiation. IR absorption spectra can be created by measuring changes in fluorescent emission at different wavelengths and IR chemical maps can be created by measuring the change in fluorescent emission at one or more wavelengths as a function of position on the sample. FE-PTIR can achieve ~100× better sensitivity than conventional O-PTIR measurements because the temperature dependence of fluorescent emission efficiency of around 1%/° C. is around 100× higher than the intrinsic photothermal sensitivity of most materials.

In the previously-filed application WO 2022/020356, the conventional knowledge was noted that fluorescent dyes would provide a significant improvement over the intrinsic photothermal sensitivity of most materials. Examples of such conventional wisdom were provided, for example "Temperature measurement in the microscopic regime: a comparison between fluorescence lifetime- and intensity-based methods" by C. Paviolo et al., in the Journal of Microscopy, 22 Mar. 2013, as well as in "Application of Temperature-Dependent Fluorescent Dyes to the Measurement of Millimeter Wave Absorption in Water Applied to Biomedical Experiments" by Kuzkova et al. in the International Journal of Biomedical Imaging in November 2014. The applicant noted that systems and methods described therein could improve sensitivity of photothermal measurements by a factor of about 100× as compared to photothermal measurements alone.

FE-PTIR approach is anticipated to become extremely important commercially due to its ability to provide co-located fluorescence imaging and IR spectroscopic analysis with 100× better sensitivity than previously available. However, the addition of the added fluorophore that provides this significantly-enhanced sensitivity can be time-consuming, expensive, and in some cases may alter the sample in an undesired way, as described for example in Jensen, Use of Fluorescent Probes: Their Effect on Cell Biology and Limitations, 295 AR Insights 12 (12 Oct. 2012).

Conventional fluorescent labeling is performed to highlight and localize specific components in biological cells and tissue. It provides an auxiliary benefit in FE-PTIR by being a more sensitive reporter of IR absorption than the intrinsic photothermal sensitivity of most samples. It is desirable to achieve a similar sensitivity improvement however without requiring the fluorescent labeling steps, or when fluorescent labeling is not practical or desired.

Autofluorescence is a known property of many biological materials, but it is often regarded as a nuisance background for conventional fluorescence microscopy and conventionally fluorescent dyes/proteins are chosen to try to have an emission efficiency that is substantially higher than the autofluorescence background. Thus one might nominally expect that autofluorescence emission efficiencies would be too low for efficient FE-PTIR operation. Subsequently and surprisingly, it has been found that the systems and methods described herein can achieve sufficient excitation of autofluorescence and sufficient modulation of that autofluorescence by IR absorption to enable practical fluorescence-enhanced photothermal infrared spectroscopy and imaging without needing to rely on addition of external fluorophores such as fluorescent dyes or fluorescent proteins. Specifically, it has been found that through use of the specific structures, wavelengths, pulse timings, and analysis methods as described herein, high levels of signal to noise can be obtained in an autofluorescence based photothermal analysis, while eliminating the need for a dye or other added fluorophore. Furthermore, conventional photothermal analysis methods resulted in bleaching of many types of samples too quickly, and the effects of bleaching using the methods described herein are reduced, which are applicable to both the use of exogenous fluorophores like fluorescence dyes and proteins as well as autofluorescence applications with no externally added fluorophores.

Using autofluorescence-based FE-PTIR also allows significant reduction of coherent interference artifacts from the image, as described in more detail below. In contrast, the laser-based approach used in conventional OPTIR can generate coherent interference artifacts that can cause confusion about the distribution of different chemical species within a sample. Specifically, when the sample is illuminated with probe radiation from a narrowband laser source, it is possible for that laser beam to reflect or scatter off multiple surfaces within in the sample and sample substrate. If probe light from these multiple reflections or scattering events recombine coherently at the detector, this can result in constructive or destructive interference that can be indicative of height variations in the sample as opposed to differing strength of IR absorption. The FE-PTIR approach essentially eliminates coherent artifacts because the light collected at the detector is at a different wavelength than the probe beam excitation light. Specifically, one or more filters are used in the FE-PTIR approach to block the excitation probe light from reaching the detector.

Any probe excitation light that undergoes multiple reflections/scattering events does not contribute to the IR photothermal signal and thus does not create unwanted artifacts. It is desirable to minimize or eliminate these coherent artifacts for all samples, but there are many samples where the addition of external fluorophores is not desired. But it is still desirable to suppress the coherent artifacts absent external fluorophores.

Counterpropagating Microscope Design

FIG. 1A shows a simplified schematic diagram of a microscope 100 for autofluorescence-based FE-PTIR with simultaneous confocal fluorescence imaging of a sample 102. In summary, an autofluorescent excitation radiation 102 is used to excite autofluorescent emission from sample 102. Absorption of infrared radiation from IR source 104 by the sample 102 causes a modulation in the amount of autofluorescent emission from the sample. By recording changes in the amount of autofluorescent emission from the sample in response to IR radiation, one can produce a signal that is indication of the IR absorption properties of the sample. Below we describe the key aspects: (1) exciting autofluorescent emission from the sample; (2) illuminating the sample with infrared light to cause a temperature change in the sample; (3) collecting autofluorescence emission from the sample; (4) detecting autofluorescence emission; (5) detecting IR induced temperature change via changes in autofluorescent emission; and (6) creating signals indicative of IR absorption by the sample based on the change in autofluorescent emission.

(1) Exciting Autofluorescent Emission from the Sample.

AF excitation radiation source 106 generates an AF excitation beam, indicated in FIG. 1A with an arrow originating at the AF excitation radiation source 106, that passes through an excitation filter 112, is reflected off dichroic mirror 114, focused by objective 116, and focused to the sample 102. In particular, AF excitation radiation source 106 generates an AF excitation beam that illuminates the region of the sample that that will be illuminated by the IR beam as described below. Any number of additional directing, focusing, filtering, or modulating structures can be arranged along the beam path between the AF excitation radiation source 106 and the sample 102.

The AF excitation radiation source preferably can emit at wavelengths that correspond to efficient autofluorescent emission from the samples of interest. For example, as described later associated with FIG. 2, many biological materials have fluorescent autofluorecent emission when excited in the UV, for example in the range of 250-400 nm, or specifically at UV laser lines around 266 nm and 366 nm.

Figure 3A:
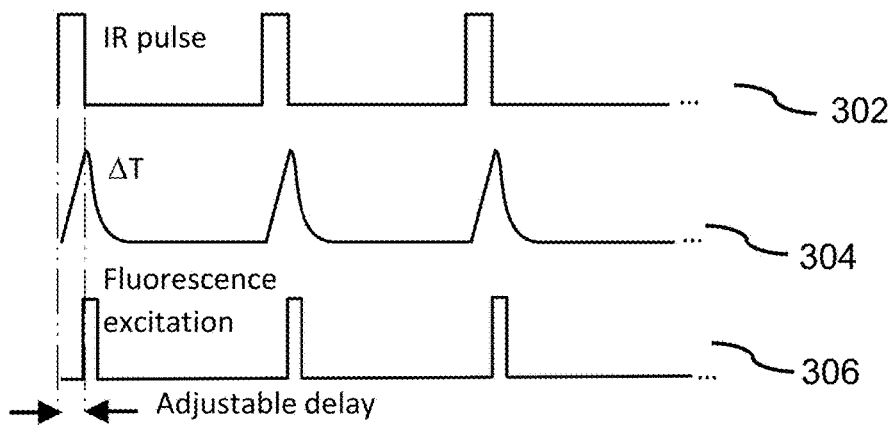
FIG. 3A is a timing diagram showing IR beam pulse, sample temperature, and excitation beam pulse along a shared time axis according to an embodiment.
Figure 3B:
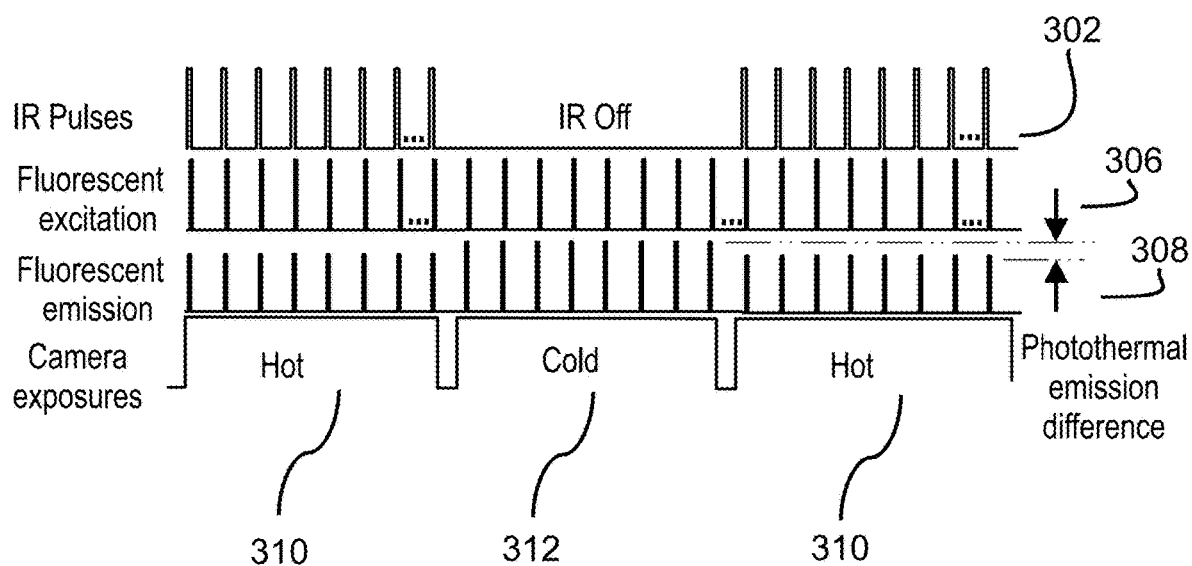
FIG. 3B shows the timing diagram of FIG. 3A along a longer time duration that includes both hot and cold frame measurements, according to an embodiment.

In one embodiment, to achieve improved SNR, an AF excitation radiation source 106 should produce short yet bright light pulses over a range of different fluorescent excitation lines of interest and that can be synchronized to the timing of the maximum temperature rise in the sample, as described with respect to FIGS. 3A and 3B. Suitable pulsed excitation sources include but are not limited to: ultra-bright pulsed LEDs, pulsed monochromatic laser sources, pulsed laser diodes, pulsed superluminescent diodes, pulsed tunable lasers, pulsed supercontinuum broadband visible laser sources and other suitable sources with emission in an appropriate range for fluorescent/autofluorescent excitation. Conventional UV/white light excitation sources like halogen lamps may also be used in combination with suitable shutter/wavelength filters.

A suitable AF excitation radiation source 106 can be constructed with ultra-bright light emitting diodes (LED) in combination with a high current pulse driver circuit, for example as described in U.S. Pat. No. 9,603,210 "High speed, high current pulsed driver circuit" by Carlen. Suitable pulse drive electronics for ultra-bright LEDs using enhancement mode field effect transistor half bridge circuits, for example using eGan® transistors from Efficient Power Conversion. AF excitation radiation source 106 can be, for example, a tunable or fixed wavelength source of light, typically (though not necessarily) at a shorter wavelength than that of IR source 104. AF excitation radiation source 106 can be set to a wavelength that corresponds to a specific molecular bond to identify specific materials within the sample 102, as described below in more detail with respect to FIG. 2.

Excitation filter 112 is an optional component that can be used to provide an AF excitation beam at a desired wavelength even where AF excitation source is not tuned to a specific wavelength. Especially in the case of a broadband LED excitation source, excitation filter 112 can be placed after the excitation source to select specific wavelength range for efficient autofluorescence excitation. The excitation filter 112 preferably has high transmission around the optimal wavelengths or autofluorescence excitation and preferably blocks wavelengths that correspond to possible autofluorescent emission from the sample. The excitation filter 112 can comprise one or more short pass filters, bandpass filters and/or multiband filters. The excitation filter 112 can also be fixed, exchangeable, adjustable, or tunable. For example, an acousto-optical tunable filter (AOTF) can be used as a tunable excitation filter 112.

Dichroic mirror 114, like excitation filter 112, is an optional component arranged between the AF excitation source 106 and the sample 102. The AF excitation beam is in the embodiment shown in FIG. 1A is incident on the dichroic mirror 114 that reflects excitation light towards the sample 102. The excitation light is focused by the objective 116 towards the region of the sample. While the excitation radiation can be focused to a diffraction limited spot for point measurements, in a preferred embodiment, the excitation radiation is configured to illuminate a wide area of the sample 102, at least 10 µm across, and preferably >50 µm across, or even >100 µm across, in the widefield embodiment shown in FIG. 1A. The excitation light is chosen to be of a sufficient intensity and wavelength to generate a substantial autofluorescence response in the sample 102.

Autofluorescent emission from the sample 102 is collected by an objective 116. In the embodiment shown in FIG. 1A, the collection objective is the same objective 116 used to illuminate the sample with excitation light, a so-called epi-fluorescence configuration In this case, autofluorescent emission from the sample is transmitted through the dichroic mirror 114, whereas the excitation beam at the original wavelength(s) that originated at the AF excitation source 106 (and optionally filtered by the excitation filter 112) is substantially reflected, with only a small portion of excitation light passing through the dichroic mirror 114 due to practical optical density limits on dichroic mirrors.

(2) Infrared Excitation

Microscope 100 includes a second light source IR source 104 to probe molecular vibrations in the sample for the purposes of performing infrared spectroscopy and infrared chemical imaging. IR source 104 can be, for example, a tunable IR narrowband source and/or a broadband IR source. When the beam 105 emitted by IR source 104 contains at least one wavelength that corresponds to an absorption band within the sample 102, the IR absorbing regions of the sample 102 will heat up with each IR pulse or over each IR modulation cycle (depending on the details of the IR source).

The light sources (104, 106) may be controlled by one or more pulse generators 108. Pulse generator 108 can trigger output pulses, control inputs, and/or modulate the output from each of the light sources (104, 106). IR source 104 and AF excitation source 106 can either be modulated directly (i.e., by causing the sources 104 and 106 themselves to create pulsed beams) or indirectly (e.g., by operating a chopper or other structure that modulates a constant beam). Both of IR source 104 and AF excitation source 106 can be modulated directly, both can be modulated indirectly, or one can be modulated while the other is modulated indirectly.

IR source 104 generates an IR beam, indicated in FIG. 1A with an arrow originating at the IR source 104, that is received at an IR objective 110 and focused to the sample 102. In one embodiment the IR source 104 is a tunable mid-IR laser than can be tuned to different wavelengths. FIG. 1A shows a mirror arranged between IR source 104 and IR objective. In embodiments, there can be any number of optical structures arranged between IR source 104 and sample 102 that provide modulation, direction, filtering, and focusing to arrive at the sample 102. In particular, IR source 104 creates an IR beam that is directed to a specific region of the sample 102 that is also illuminated by the AF excitation beam as described above.

Light from the IR source 104 is optionally focused on the sample 104 using a IR objective 110 as a focusing optic to create an IR illuminated area or region on the sample that at least partially overlaps with the region illuminated by AF excitation source 106. The IR light source 104 creates an IR beam that can be focused with a reflective objective 110, for example of a Schwarzschild design, an off-axis parabolic mirror, or other reflecting optic, and/or a refractive objective constructed using IR transparent materials. It is also possible to simply use a raw beam from an IR laser if it is sufficiently small and/or intense. The IR optic 110 is configured to illuminate a wide area of the sample, at least 10 um across, and preferably >50 um across, or even >100 um across. In one embodiment the IR and AF excitation illumination regions can be arranged to be substantially similar such that there is a common wide area of the sample that has both the IR illumination and the AF-based IR absorption readout.

(3) Collecting Autofluorescence Emission from the Sample

After exciting autofluorescent emission from the sample, microscope 100 is used to detect modulations in this emission due to the absorption of IR light by the sample 102. Autofluorescent emission is collected by an objective, for example UV/vis objective 116. Autofluorescent emission can alternately/additionally be collected by IR objective 110 and/or by additional collection optics. In FIG. 1A, a counter-propagating geometry is shown, with the IR beam delivered to one side of the sample and autofluorescence emission/collection performed on the other side of the sample. But it is equally possible to perform autofluorescence photothermal IR measurements in a co-propagating configuration, for example where an IR compatible objective (e.g. a Schwarzschild objective) can be used to focus both the IR and autofluorescence excitation and collect the autofluorescence emission with the same objective.

Continuing with the counter-propagating configuration shown in FIG. 1A, autofluorescence emission from sample 102 can pass through dichroic 114 where it can be additionally filtered by optional autofluorescence filter 118 to block any remnant of the original excitation wavelength(s) from the AF excitation source 106, while efficiently passing autofluorescent emission from the sample 102. Suitable emission filters are available for example from Thorlabs, Semrock, Chroma, and other suppliers. However, the autofluorescence filter 118 in the microscope 100 shown in FIG. 1A is preferably different than those traditionally used in fluorescence microscopy in which fluorophores have been added. In the case of using specific fluorophores the emission filters are selected to isolate the fluorescent emission from a specific fluorophore and to exclude emission from other fluorophores. In microscope 100, it can be desirable to collect as much autofluorescent light as possible covering as many possible materials as possible. For this reason, a long-pass filter may be used instead of a bandpass filter more commonly used for fluorescence microscopy applications. In one embodiment, the emission filter can be a long pass filter with a cut-on frequency of around 425 nm, for example model ET4251p from Chroma or 400 nm or 450 nm FELH0400 or FELH0450 from Thorlabs.

(4) Detecting Autofluorescence Emission

Once the autofluorescent emission optionally passes through dichroic 114 and autofluorescence filter 118, it is collected at a detector 122. Optional optic 120 can be used to direct at least a portion of the collected autofluorescence emission on the detector 122. Detector 122 can be a single element detector to collect light from a single region of the sample. In a preferred embodiment, however, detector 122 can be an array-based detector for example a camera-based detector to enable collection of autofluorescent emission from a plurality of locations on a sample. In the case of widefield detection with an array/camera based detector, optional optic 120 can for example be a microscope tube lens 120.

In the widefield embodiment, detector 122 can be any of a number of structures capable of widefield detection. In the case of an array-based detector, detector 122 can comprise a detector with multiple photosensitive elements, for example a linear array or 2D array of photosensitive elements, and/or a 1D or 2D array of photosensitive pixels. Using a camera-based detector in this case, the detection of IR-induced changes in fluorescent emission can be measured simultaneously at many locations on the sample. Such measurements can be performed using time domain measurements (e.g. subtracting camera frames of measured fluorescence with the IR beam on vs off) and/or with lock-in cameras, as described in more detail below with respect to FIGS. 3A and 3B.

The description of the apparatus herein relates to FIG. 1A, but it should be understood that detection of autofluorescence could be performed with any of a variety of architectures and arrangements. As described in more detail below, autofluorescent excitation and collection can be performed with different optics/objectives, for example on opposite sides of a sample. For example, autofluorescent excitation could alternately be provided from below the sample by coupling the autofluorescent excitation source 106 to condenser/objective 110, which in the embodiment of FIG. 1A is also used to deliver infrared radiation to the sample. In an alternate configuration the IR light beam from source 104 could be directed to the top side of the sample and the fluorescent excitation/detection could be from the bottom, for example in the configuration of a conventional inverted optical microscope. In fact any permutation of IR from the top or bottom, autofluorescent excitation from the top or bottom, and autofluorescent detection from the top or bottom can be used to implement working embodiments for AF-PTIR.

Figure 1B:
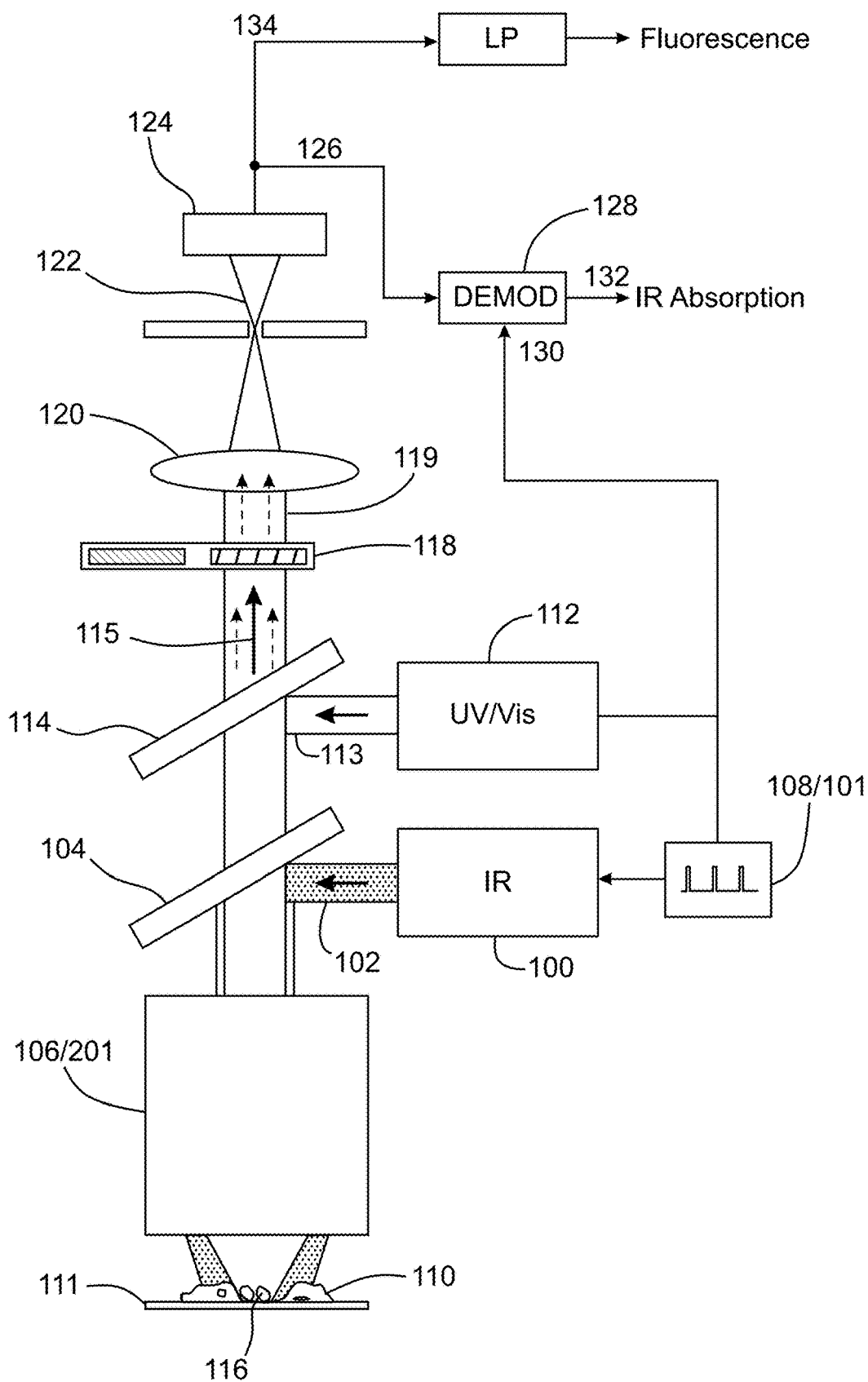
FIG. 1B is a conceptual simplified block diagram of a microscope system for fluorescence enhanced photothermal infrared spectroscopy and simultaneous confocal autofluorescence imaging.

FIGS. 1B-F illustrate some of these alternative configurations. FIG. 1B illustrates a co-propagating configuration whether the IR light beam and the autofluorescent excitation beam are arranged to be substantially colinear and then focused by a common objective onto a sample. Autofluorescent emission from the sample is then collected by the same objective and directed towards a detector. Some of the alternatives shown in FIGS. 1B-1F depict single-point detection systems that send the collected light through a pinhole (e.g., FIGS. 1B-1E), while others show widefield detection systems (e.g., FIG. 1F). Such systems are generally interchangeable; that is, in each of the drawings in FIGS. 1A-1F that shows a single-point or rastering detection system a widefield detection configuration could be used instead, and vice versa.

In the embodiment of FIG. 1B the collected light is optionally focused through a confocal pinhole before the detector. This arrangement can be desirable using a autofluorescent excitation source that can be focused to a tight spot, for example a laser light source, and then the confocal pinhole provides depth resolved detection and rejection of autofluorescent light from outside the focal plane of the objective. FIG. 1B also illustrates the use of an exchangeable emission filter to select a specific range of autofluorescence. The embodiment shown in FIG. 1B uses a different structure in that it includes a blocking filter 118 that is different from the version depicted in FIG. 1A.

The inclusion of blocking filter 118 provides a significant improvement in spatial resolution of the photothermal measurement as it will only permit passage of the wavelength shifted fluorescent light 119. Thus, in the example of FIG. 1B, the filter 118 will only pass fluorescent light emitted from body 150. But the fluorescent light emitted/collected from body 150 also still contains the imprint from IR absorption of body 150. That is, periodic IR absorption by body 150 will cause a corresponding periodic change in the intensity, angular distribution and/or phase of the fluorescent light emitted from body 150. Thus, by analyzing the periodic changes in the collected fluorescent light, it is possible to perform IR absorption measurements on length scales even smaller than the size of focused probe beam 116.

Figure 1C:
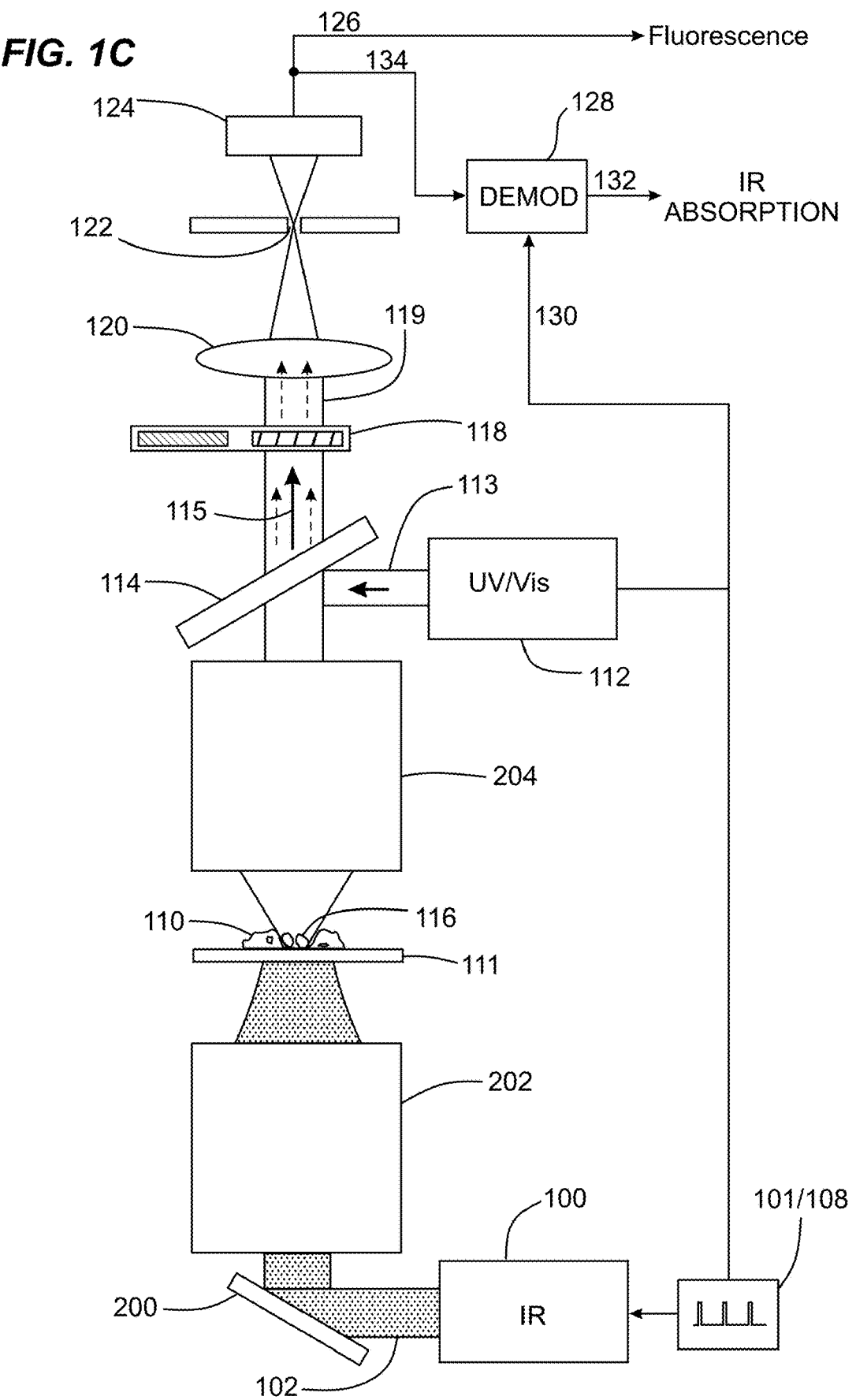
FIG. 1C is a conceptual simplified block diagram of a microscope system for autofluorescence enhanced photothermal infrared spectroscopy and simultaneous confocal imaging employing a counter-propagating geometry.

FIG. 1C illustrates a counter-propagating arrangement where the IR light is delivered to the sample from below and autofluorescent excitation and detection is performed from above the sample. This embodiment also illustrates the use of exchangeable emission filters and confocal detection, either of which can be implemented on the embodiment of FIG. 1A as well.

In the embodiment shown in FIG. 1C, IR beam 102 is emitted from IR source 100 and optionally reflected off mirror or dichroic 200 where it is then focused by focusing optic 201 onto sample 110. In this case focusing optic 201 can be chosen to be optimized to focusing of IR light, whereas focusing optic 106 can be optimized for focusing/collecting/imaging visible light and specifically the wavelength(s) of UV/VIS source 112 and the resulting fluorescent emissions from the sample/specimen 110/111. Focusing optic 201 may for example be a reflective objective of a Schwarzschild or similar design, an off-axis parabolic mirror, a refractive objective made of IR transparent material(s) or any similar optic capable of focusing IR light. Focusing optic 204 is used to focus and collect UV/visible light, including the incident probe light 113 as well as any fluorescence emission from the sample. Focusing optic 204 may be a high quality, high numerical aperture refractive object such as those commonly used for fluorescence microscopy. In particular focusing optic 204 may be chosen to have good performance at wavelengths corresponding to fluorescence excitation and emission wavelengths, and thus may include optical components that are UV transmissive (in the case of a refractive objective) or UV reflective (in the case of a reflective objective). In this configuration, if a sample substrate 111 is employed, it may be desirable to select a material with high IR transmissibility, though the substrate need not be transmissive to UV/visible light since the fluorescence emission is collected in a backscatter configuration. Optic 200 can be a simple fixed mirror, an adjustable mirror, an electronically controllable mirror like a galvo or fast steering mirror to provide relative adjustment of the overlap between the focus spots of the visible and IR beams. Optic 200 can additionally or alternately be a dichroic mirror to permit visible illumination from below the sample, i.e. reflective for IR light and transmissive to at least a desired range of visible light.

Figure 1D:
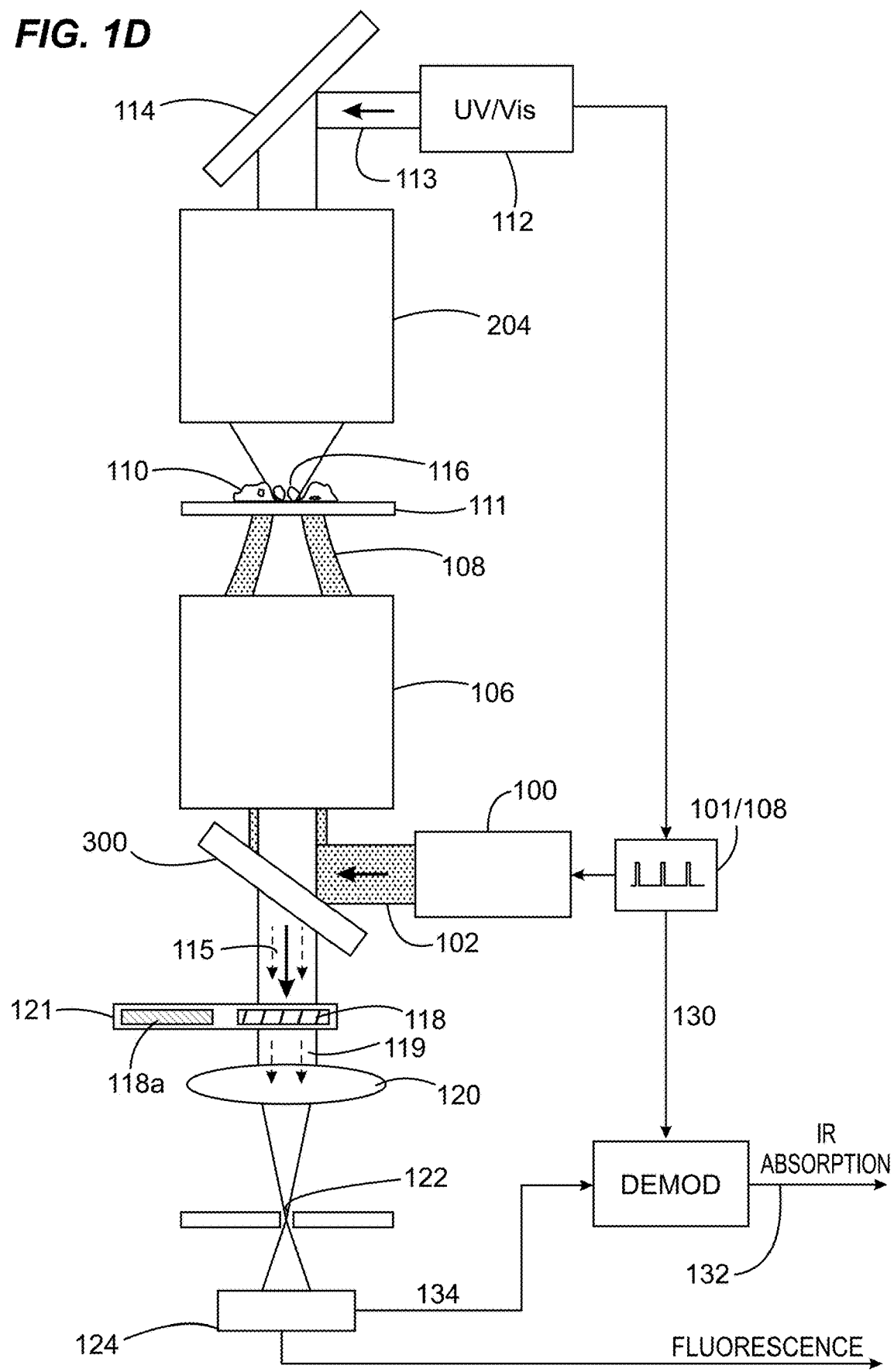
FIG. 1D is a conceptual simplified block diagram of a microscope system for autofluorescence enhanced photothermal infrared spectroscopy and simultaneous confocal autofluorescence imaging employing a counter-propagating geometry and transmission detection.

FIG. 1D shows an embodiment where the IR excitation is arranged from above the sample and AF excitation and detection is performed from below the sample in an epi-fluorescence configuration akin to conventional inverted optical microscopes. This arrangement has a specific advantage that the sample substrate, i.e. the surface the sample is mounted on, does not need to be IR transparent. For example the sample substrate can be a cover slip or glass slide where the AF excitation and emission can readily penetrate the substrate, but it is not necessary for the IR beam to transmit through the substrate as long as the sample is on the top surface of the substrate. This is a configuration that enables the use of low cost glass cover slips or slides versus IR transparent substrates.

FIG. 1D illustrates a simplified schematic diagram of an embodiment of fluorescence enhanced photothermal infrared spectroscopy using a counter propagating geometry and transmission detection. FIG. 1D is based on FIGS. 1A-1C and when identical numerical callouts are used, the descriptions associated with FIGS. 1A-1C applies as appropriate. FIG. 1D is similar to FIGS. 1A, 1B, and 1C, except that the detection of fluorescence emission and fluorescence enhanced IR absorption is performed after the probe light has passed through the sample/specimen 110/111. This arrangement can be desirable when the sample or specimen has low reflectivity to visible light and/or when the forward scattering path is more efficient for fluorescence collection. In the embodiment shown, dichroic 300 is selected to be reflective for IR wavelengths and transmissive for wavelengths corresponding to fluorescent emission by the sample and optionally also transmissive to the probe beam. Dichroic 300 may also be chosen to be reflective or absorptive to the excitation wavelength of the probe beam source, thus eliminating the need for the blocking filter 118. In this case focusing optic 204 may be optimized for focusing of UV/visible light and focusing optic 106 is used to both focus the IR light and collect fluorescent emission from the sample 110.

Figure 1E:
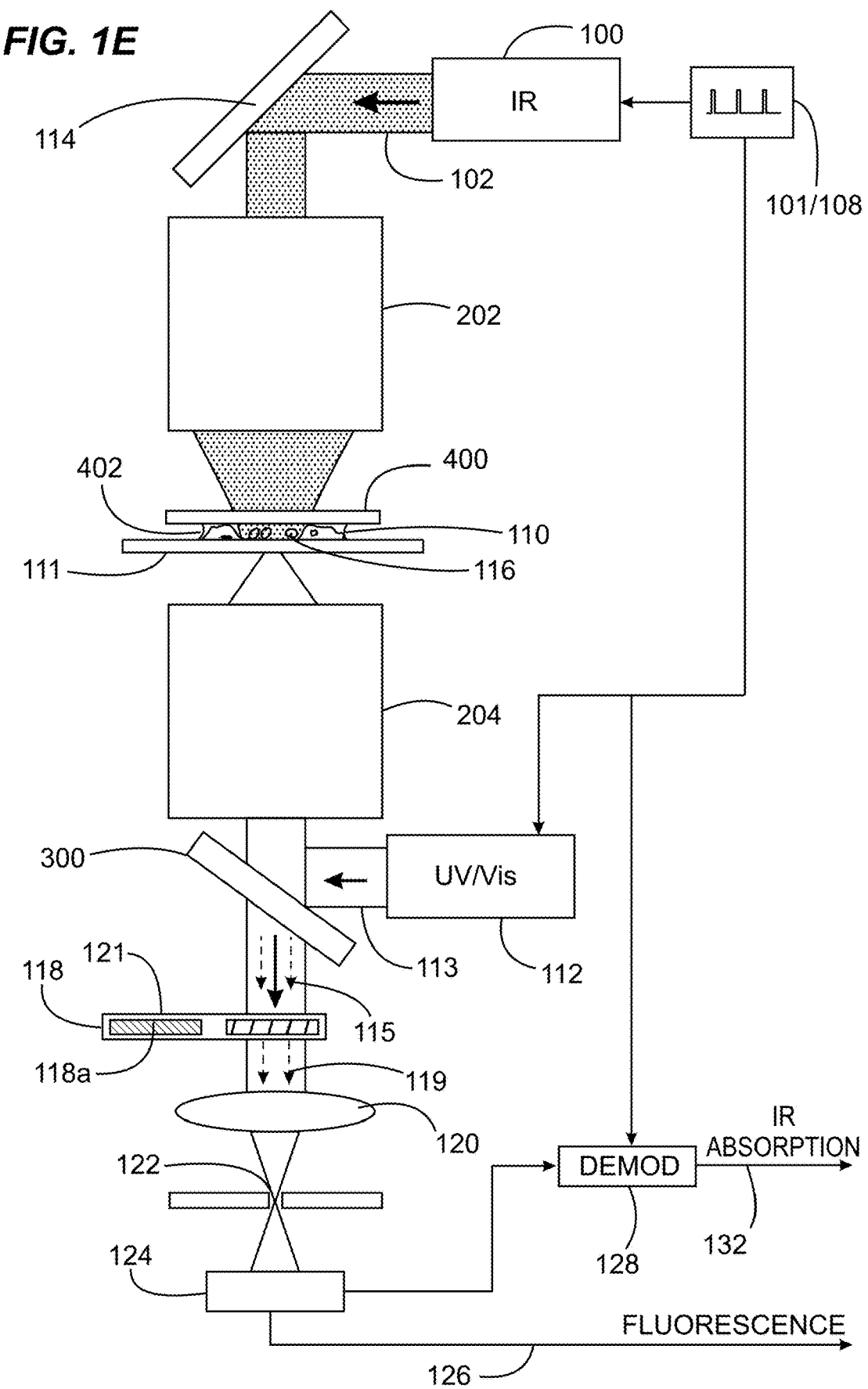
FIG. 1E is a conceptual simplified block diagram of a microscope system for autofluorescence enhanced photothermal infrared spectroscopy and simultaneous confocal autofluorescence imaging employing a counter-propagating geometry with an inverted optical microscope configuration.

The embodiments shown in FIGS. 1C and 1D have the IR light coming from below the sample and the UV/VIS probe light coming from above the sample, a configuration similar to a traditional upright optical microscope where a refractive microscope objective is placed above the sample. This configuration can be readily inverted such that the UV/VIS light comes from under the sample and the IR light comes from above. FIG. 1E shows such an inverted configuration that can then be compatible with the setup of conventional inverted optical microscopes that are commonly employed in cell biology and other biological research. FIG. 1E is based on FIGS. 1A-1D and when identical numerical callouts are used, the descriptions associated with FIGS. 1A-1D applies as appropriate. In the embodiment of FIG. 1E the IR light 102 from IR source 100 is delivered to sample 110 from above the sample via focusing optic 201, whereas the UV/visible light 113 is delivered to the sample from below via focusing optic 204.

This arrangement is advantages for a few reasons. First, sample substrate 111 need not be IR transparent and can in fact be a conventional glass slide, cover slip or petri dish, as used commonly in cell biology. The sample substrate 111 should however be transmissive to the wavelengths of interest of the UV/VIS source 112 as well as any fluorescent emission wavelengths of the sample that are of interest. It is also possible to perform measurements of fluorescence-enhanced photothermal IR spectroscopy with the sample under fluid, for example an aqueous buffer solution. This can be achieved by using a thin IR transparent cover glass 400 on top of sample 110 and sample substrate 111 with a thin layer of liquid 402 in between. It is also possible to support larger thicknesses of liquid, for example by adhering the specimen to the bottom of the cover glass 400, thus eliminating the need to transmit IR light through the liquid and avoiding any IR absorption associated losses. It is also possible to mount the sample/specimen in sealed fluid cell to prevent evaporation of liquid and/or a perfusion cell to allow for the exchange of fluid/nutrients, etc.

FIG. 1E shows a variation on FIG. 1D where an IR transparent window or cover slip is placed on top of the sample and sample substrate to enable measurement on a sample immersed in a liquid, for example an aqueous buffer solution.

Figure 1F:
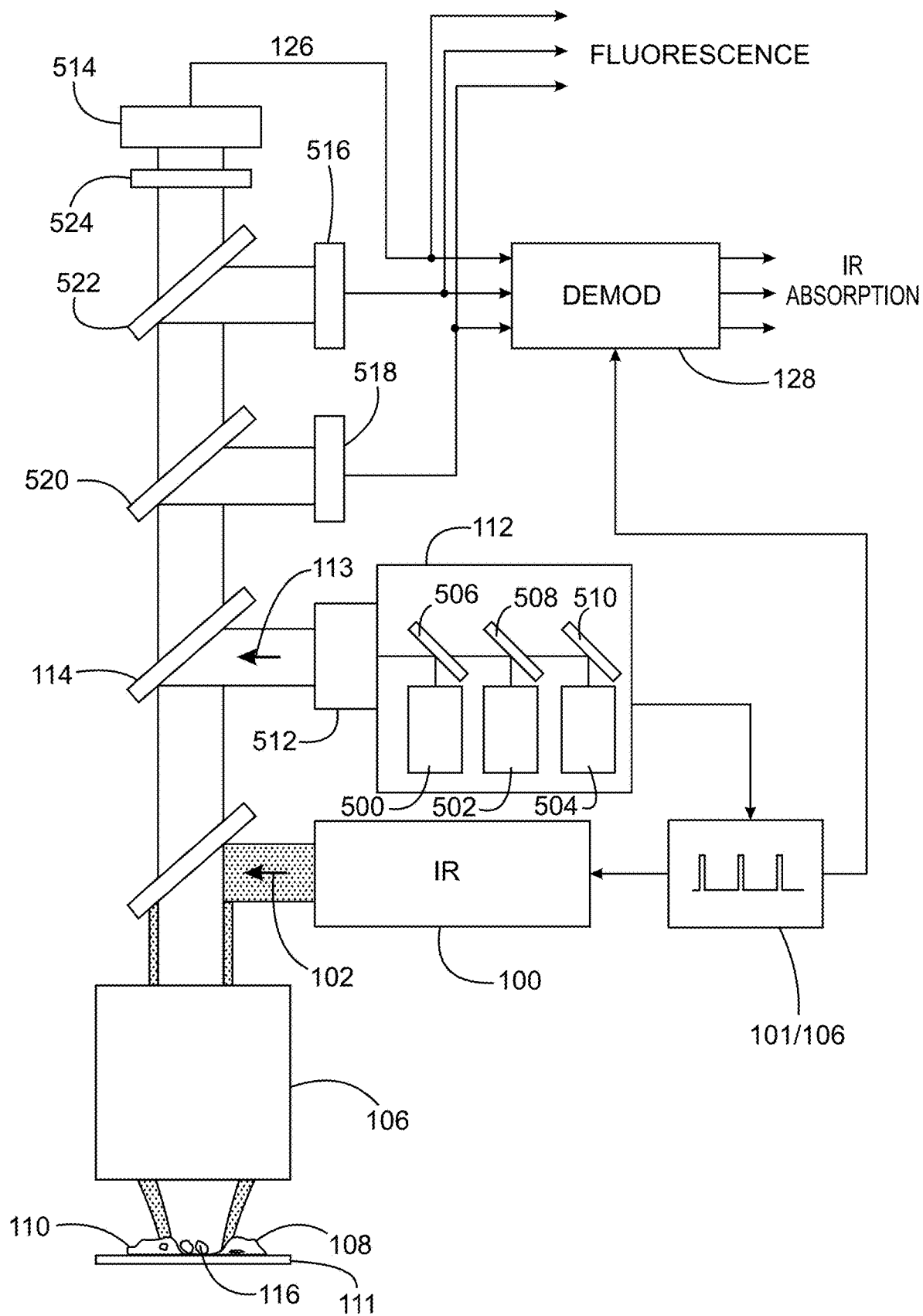
FIG. 1F is a conceptual simplified block diagram of a microscope system for autofluorescence enhanced photothermal infrared spectroscopy and simultaneous confocal autofluorescence imaging with multi-line laser excitation and multi-line autofluorescence detection.

FIG. 1F illustrates an embodiment employing simultaneous or sequential multi-line fluorescence and fluorescent enhanced photothermal IR measurements. FIG. 1F is based on FIGS. 1A and 1B and when identical numerical callouts are used, the descriptions associated with FIG. 1 applies as appropriate. In FIG. 1F, the UV/VIS source 112 comprises a plurality of UV/VIS sources 500, 502, 504 that emit at different center wavelengths 1i, 12, and 13, etc. corresponding to different excitation wavelengths of fluorescent tags and/or intrinsic autofluorescence of interest. Alternately, UV/VIS source may be a supercontinuum laser that emits light over a range of wavelengths and may be combined with one or more narrow band filters, including variable tunable filters. In the case of discrete UV/VIS sources shown, dichroic mirrors 506 and 508 can be used to combine the beams from sources 500, 502, 504 onto the same optical path. (Element 510 can be a simple mirror.) Note that the discrete UV/VIS sources may also be remote from the microscope system and fiber coupled into the microscope in which case the dichroic mirrors 506 and 508 are combining beams from the output of optical fibers rather than directly from a light generating source like a laser diode. The combined UV/VIS beams can optionally be directed to a beam conditioning/scanning unit 512, where the beams can be expanded, filtered, and/or attenuated as desired. Unit 512 may also contain opto-mechanics to provide beam scanning, e.g. one or more galvo scanners, scan lenses, etc. UV/VIS source 112 may also include shutters and or flipper mirrors to enable/disable emission from one of more of the individual UV sources 500, 502, 504 from exiting the integrated UV/VIS source 112.

After one or more UV/VIS beams leave the beam conditioning/scanning unit 512, the apparatus operates in a fashion similar as described in FIG. 1A, except that the sample can be excited at more than one wavelength at once. In turn, fluorescent emission may occur over a plurality of different wavelengths. To accommodate this, multiple detectors 514, 516, and 518 are provided along with appropriate dichroic filters 520 and 522 to divert fluorescent light of a desired wavelength range to detectors 516 and 518, as well as an optional blocking filter 524 to further filter any light passing through filters 520 and 522 that is not in the range of interest for measurements at detector 514. If desired dichroic filters 520 and 522 and blocking filter 524 may be exchangeable and/or tunable to accommodate the fluorescence from different fluorescent dyes. As with FIGS. 1A and 1B, the outputs from detectors 514, 516, and 518 travel on two parallel paths, in the one case on path to a demodulator to extract an AC signal indicative of IR absorption, and on an alternate path for fluorescence detection as described above. This arrangement allows simultaneous or sequential measurement of fluorescence and fluorescent enhanced photothermal IR signals at multiple excitation and emission wavelengths. Note that while three emission wavelengths are shown at three excitation/emission wavelengths, this apparatus can be adapted to accommodate as many simultaneous excitation/emission wavelengths desired.

In each of FIGS. 1A-1F, the pulse source thereof is coupled to both light sources, for excitation and for heating/infrared/pump beams. The coordinated timing of these light sources can be used to create pulse trains as described in more detail below with respect to FIG. 3, which can be used to obtain autofluorescence data to characterize a sample.

(5) Detecting IR Induced Temperature Change Via Changes in Autofluorescent Emission Collected fluorescent light that is detected at detector 122 is demodulated by demodulator 124 to produce a signal that is indicative of an AC modulation of the collected autofluorescent light. In one embodiment demodulator 124 can for example be a lock-in amplifier and the AC signal can be an amplitude, phase, in-phase or quadrature signal, or any synchronous measurement of an AC modulation of the autofluorescent light.

In the case that detector 122 is an array-based detector like a camera, IR induced temperature changes can be determined by comparing images obtained at different intensities of IR illumination, for example comparing an autofluorescence image frame obtained at a first value of IR illumination with an autofluorescence image frame obtained at a second value of IR illumination. In the simplest case, the first value of IR illumination can be zero (i.e., with the IR beam off). The second value of IR illumination can be selected to cause a detectable change in autofluorescent emission from the sample. But in some cases it is not necessary for one of the IR illumination values to be zero. For example the IR light could be modulated between 50% and 100% of nominal beam power and this would still produce a modulation in the autofluorescence from the sample. In embodiments, a sinusoidal modification of the amplitude of the IR light can be performed, and the photothermal effect on autofluorescent emission can be detected as between low-IR-amplitude and high-IR-amplitude time periods. In the case of a camera-based detector, the demodulator can be an image subtractor/e.g. to calculate differences in images between the first and second autofluorescence images at the first and second values of IR illumination.

It can be desirable to further accumulate this image pair difference, for example summing the difference for tens, hundreds, or even thousands of autofluorescence images at the two different values of IR illumination. In the simplest case the demodulator can be summing the difference between so called cold frames (IR off) and hot frames (IR on), for example in processor 126. Note that the image subtraction/accumulation shown in FIG. 1 with demodulator 124 and processor 126 is for illustrative purposes, but does not necessarily imply separate physical structures to accomplish the image pair subtraction and accumulation. For example the image subtraction and accumulation functions can be performed on the same processor, for example a field-programmable gate array (FPGA) or a microprocessor, and/or a host computer. In some cases all the image subtraction and accumulation can be performed using on-board demodulator/processer functions integrated with the camera-based detector. Alternately, the images can be rapidly transferred to a frame grabber and/or host computer and the image subtraction/accumulation can be performed on either/both of these devices. The image subtraction and accumulation can be performed on the same processor or these functions can be divided between different processors as desired.

The demodulator for camera-based detection may also be more complex than simple image subtraction/accumulation. For example in the case of a sinusoidally modulated IR source, it may be desirable to scale different images based on the relative strength of the IR power at the time the image was captured. It is also possible to employ noise reduction techniques in the image summing, for example using statistical analysis to maintain and reinforce features that are common across successive image pair differences, while discarding those features that do not reproduce and result from noise. It is also possible to perform "lock-in" detection using a camera based detector. For example, using a reference signal from pulse generator 108 (as indicated by the dashed line) it is possible to perform a high sensitivity measurement of AC modulation of the fluorescence signal in sync with the modulation of the IR source 104 and AF excitation source 106. In all of the cases above, the demodulator (e.g., 124) and/or processor (e.g., 126) produce a signal that is indicative of a change in autofluorescent emission from the sample in response to IR absorption by the sample.

(6) Creating Signals Indicative of IR Absorption by the Sample Based on the Change in Autofluorescent Emission.

The signal indicative of change in autofluorescent emission from the sample generated by demodulator 124 and/or processor 126 can be used calculate IR absorption spectra and/or generate IR chemical images based on the photothermal changes in autofluorescent emission. Specifically, if the change in autofluorescent emission from the sample is measured at a plurality of locations on the sample at one or more IR wavelengths, these measurements can produce maps or images showing the strength of IR absorption by the sample at the chosen wavelengths. More specifically, these maps/images can represent the distribution of different chemical species based on their IR absorption properties. Additionally, if the change in autofluorescent emission is measured over a plurality of IR wavelengths, it is possible to produces an IR absorption spectrum, i.e. a representation of the IR absorption properties of the sample at one or more locations on the sample. In the case of widefield detection with an array based detector, e.g. a camera, it is possible to measure IR absorption spectra for hundreds or thousands or even millions of locations on the sample simultaneously.

In use, the microscope 100 depicted in FIG. 1A can generate images of sample 102 that indicate the presence of various molecules, compounds, or types of chemical bonds indicative of chemical structures within the sample 102, such as in the form of a hyperspectral array (i.e., an array of AF-PTIR images at different IR wavelengths).

Figure 2:
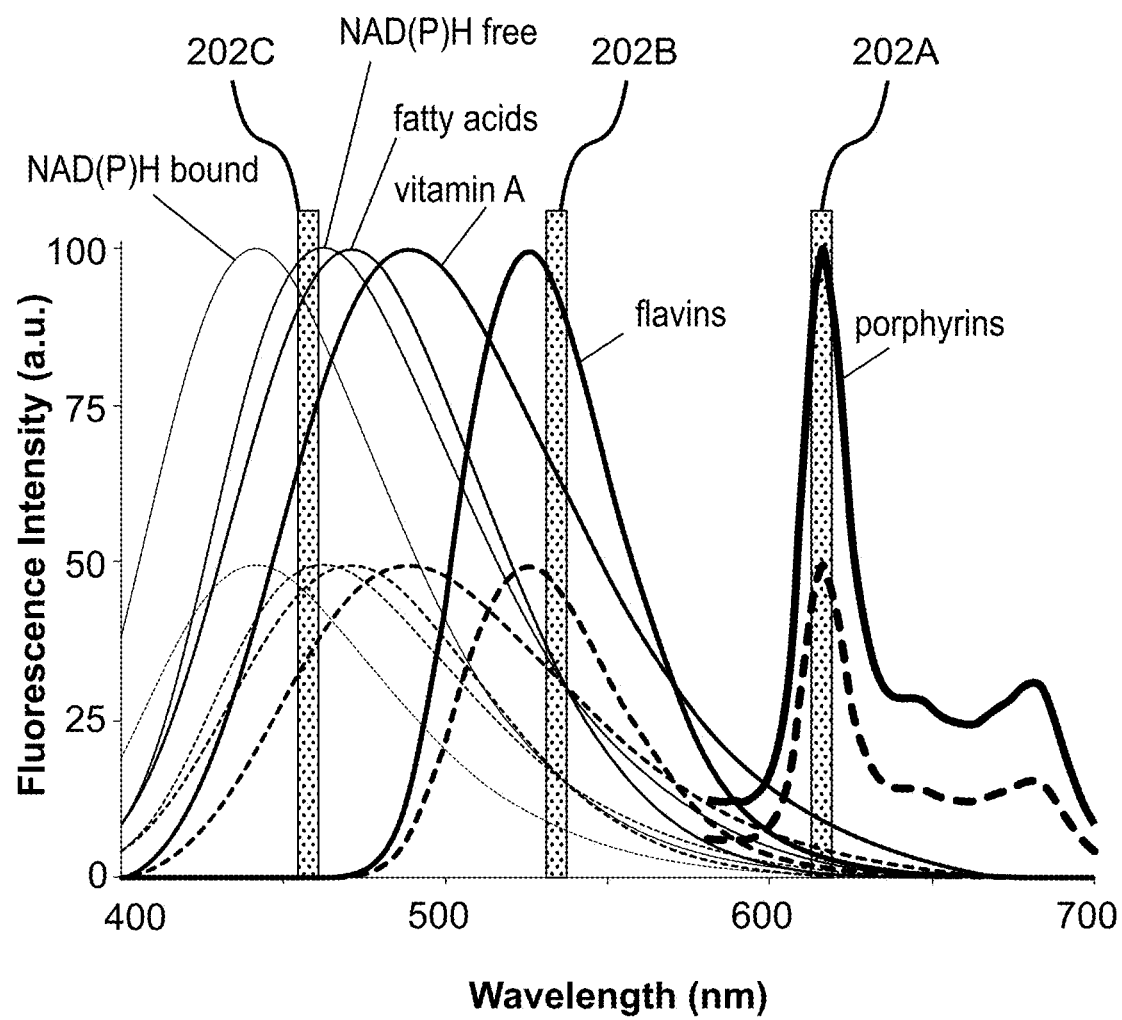
FIG. 2 shows an example of selected wavelengths for detecting autofluorescence, according to an embodiment.

FIG. 2 is a graph of autofluorescent emission spectra for a variety of biomolecules. FIG. 2 is adapted from the article "Autofluorescence spectroscopy and imaging: a tool for biomedical research and diagnosis" by Croce and Bottiroli (European Journal of Histochemistry 2014; volume 58:2461), incorporated herein by reference. This graph depicts autofluorescence intensity when each of the substances is illuminated by an excitation source at 366 nm, for substances including a variety of biological compounds and structures. As shown in FIG. 2, the peak fluorescent response is different for each such material. The spectra in FIG. 2 have been normalized to the maximum emission peak for presentation, except for the broad emission of lipopigments. FIG. 2 shows the most efficient excitation/emission wavelengths for a variety of biomolecules that may be of interest. A key observation is that many of the biological molecules listed have efficient excitation in the UV, for example 240-400 nm, and some molecules have efficient autofluorescent excitation in the 400-500 nm range. It is therefor desirable for efficient autofluorescence excitation to employ an excitation source with emission in the UV and optionally in the short wavelength range of the visible, e.g. 400-500 nm.

The dashed lines underneath each of the solid lines in FIG. 2 depict the autofluorescent response of each of the corresponding materials, reduced as a result of having been irradiated with an infrared beam. This reduction is reversible; that is, the removal of the IR light from the sample will cause the autofluorescence intensity to increase back to the solid-line amount. The fluorescence intensity in the dashed lines is exaggerated for clarity in FIG. 2; depending upon the compound or material, the reduction in autofluorescence may be less than the drop depicted. For some substances, the drop in autofluorescence emission during infrared irradiation may be between 0.05% and 2%.

To detect a particular substance, one approach is to filter all but a wavelength band substantially centered on a peak fluorescence intensity for a particular material, such as at wavelength 202A for detection of porphyrins.

In other embodiments or to detect other substances, use of the wavelength band corresponding to peak fluorescence may not provide the best discrimination between different chemical species. For example, wavelength 202B may provide a more reliable indicator of the presence of flavins in a sample than if it were positioned at the peak of the fluorescent response. Detecting the fluorescence on the higher-wavelength shoulder of the response results in only slightly reduced detectable response. Meanwhile, other signals—such as those from vitamin A, fatty acids, and NAD(P)H free—drop off significantly at higher wavelengths.

To detect NAD(P)H free in a sample that also includes NAD(P)H bound and fatty acids, detecting fluorescence at wavelength 202C may be the most effective. Wavelength 202C corresponds to the region where the fluorescent signals from NAD(P)H bound and fatty acids are lowest, while NAD(P)H free is near its peak. Detecting fluorescence at higher wavelengths could result in significant signal from fatty acids, while detecting fluorescence at lower wavelengths would correspond to reduced detected signal from the NAD(P)H free itself and increased signal from NAD(P)H bound. Depending upon the expected composition of a sample (e.g., sample 102 in FIG. 1A) the wavelengths band used for detection used can be selected to highlight specific compounds.

To efficiently excite the autofluorescence emission as described above, AF excitation source should preferably emit light at one or move wavelengths in the range of 250-400 nm, and in one embodiment, specifically with emission around 365 nm. A suitable AF excitation radiation source can be light emitting diode, array of LEDs, laser, halogen light source, tunable laser, etc. A suitable excitation is an ultraviolet LED, for example a 365 nm LED like model M265L3 or model M365LP1 from Thorlabs or similar. The center wavelength of 365 nm of the Thorlabs sources mentioned above are a good choice to excite autofluorescence in a wide range of biological materials. As shown in FIG. 2 many different biological materials produce autofluorescence in the range of 400-700 nm under excitation at 366 nm. Broadband LED illuminators such as those available from Lumencor and Excelitas are also suitable as they can be configured to supply UV excitation in addition to excitation at other wavelengths desirable for conventional fluorescence microscopy. Alternately or additionally tunable broadband sources like supercontinuum sources, for example from NKT Photonics can be used to provide continuously tunable excitation to optimize for AF excitation for molecules of interest.

Especially in the case of a broadband LED excitation source, an optional excitation filter can be placed after the excitation source to select specific wavelength range for efficient autofluorescence excitation. The excitation filter preferably has high transmission around the optimal wavelengths or autofluorescence excitation and preferably blocks wavelengths that correspond to possible autofluorescent emission from the sample. The excitation filter can comprise one or more short pass filters, bandpass filters and/or multiband filters. They excitation filter can also be fixed, exchangeable, and/or adjustable/tunable. For example, an acousto-optical tunable filter (AOTF) can be used as an tunable excitation filter.

Pulsed Fluorescence Excitation

FIGS. 3A and 3B show pulse trains for high SNR, low bleaching FE-PTIR, each showing pulses along a common timeline.

FIG. 3A is an illustration of timing of IR pulse 302, sample temperature 304 (and temperature changes ΔT), and fluorescence excitation 306. Fluorescent excitation pulses 306 are substantially synchronized to the IR pulses 302 with an adjustable delay to overlap with the maximum sample temperature 304 rise.

Temperature 304 rises (indicated as ΔT) in response to irradiation by an IR pulse 302. The longer that the pulse 302 is on, the higher the temperature 304 of the sample will increase (i.e., the larger ΔT will be). Once the IR pulse 302 is turned off, the temperature 304 of the sample will decrease back to a baseline level. This decrease is not immediate, and therefore the peak associated with ΔT in FIG. 3A occurs just about at the end of the pulse of 302.

FIG. 3B shows the pattern of FIG. 3A, but over a longer timeline. Thousands of IR and fluorescent excitation pulses (302, 306) will be accumulated for each camera exposure. When the IR pulses are on, the fluorescent emission 308 changes in sample IR absorbing regions due to temperature dependent fluorophore emission efficiency. For example the change fluorescence emission efficiency versus temperature for typical fluorophores around room temperature is around 1%/° C., i.e. the fluorescent emission from the sample will drop roughly 1% for each degree of temperature rise due to IR absorption. Camera frames alternate between IR on (hot frame 310) and IR off (cold frame 312) and IR absorption images can be calculated from the emission difference between hot/cold frames. An arbitrary number of hot/cold frames can be co-added to achieve desired SNR levels. Note that for the cold frame, it is not necessary that the IR beam be completely off. It is sufficient to have the IR beam simply modulated/attenuated to a lower power level than the hot frame.

Benefits of Pulsed Fluorescence Excitation

The use of a pulsed or otherwise modulated IR source has been discussed above in the context of generating a signal indicative of the change in fluorescent emission from the sample. This section outlines the use of a pulsed fluorescent excitation source to achieve additional benefits, techniques that provide benefits for both photothermal IR measurements performed using both autofluorescence and also with the addition of external fluorophores. A pulsed fluorescent excitation source can be desirable for two main reasons. First the fluorescence excitation pulses can be timed to correspond to the maximum photothermal response in the sample 102, or the time at which the sample temperature increase is the highest, as described above in more detail with respect to FIGS. 3A and 3B. This approach maximizes the photothermal signal detection and reduces the impact of noise by not integrating photons at the camera 122 during times where there is little or no photothermal signal. Second, the use of a pulsed fluorescence excitation source 106 can have significant advantage regarding reduction in photobleaching of the sample 102.

Photobleaching refers to a situation where fluorescence emission from a sample can reduce over time in response to extended excitation radiation due to photodamage to fluorophores in the sample (either autofluorescent or added fluorophores.) This is especially a concern in the case of extended measurements, for example a hyperspectral array comprising a plurality of measurements at different infrared wavelengths. For example it may be desirable to obtain a series of widefield photothermal IR images over a range of IR excitation frequencies, for example 900-1800 cm-1 with 4 cm-1 spectral resolution. In this case IR absorption images would be acquired at 226 different IR wavelengths, each of which would require fluorescent excitation of the sample. In this case if the fluorescence excitation is performed using continuous wave (CW) excitation it is possible to substantially bleach sample's fluorescent emission before the hyperspectral array is completed, or alternately the measurements obtained at later wavelengths may suffer from some substantial decreased AF-PTIR/FE-PTIR sensitivity. It is therefore desirable to use pulsed or otherwise modulated AF excitation to produce a signal that has optimize the detection of the maximum photothermal response of the sample and avoids unnecessarily bleaching the sample when there is minimal photothermal signal. It is therefore desirable to enable fluorescence excitation source 106 to be pulsed to correspond to the timing of the peak photothermal signal, corresponding to the peak temperature increase in the sample 102.

Thus pulse generator 108 can be configured to drive both IR source 104 and optionally fluorescence excitation source 106 as well. Pulse generator 108 will typically provide a variable delay time between the pulses sent to the IR source and the pulses sent to the fluorescence excitation source to compensate for any latency differences between the trigger to light emission timing for the two radiation sources and also to time the fluorescent excitation source to emit at a time corresponding substantially to the maximum photothermal response from the sample, i.e. the largest change in fluorescence emission due to absorption of IR radiation.

Using pulsed fluorescent excitation provide an improvement in signal to noise (SNR) compared to equivalent systems using a CW source. Note that in the benefits of pulsed fluorescence excitation provide benefits for both intrinsic, endogenous autofluorescence, as well as fluorescence enhanced PTIR using exogenous fluorophores, e.g. like fluorescent dyes and fluorescent proteins. Table 1 shows SNR $\sigma_{coave}$ formulas for both CW and modulated fluorescent excitation. In these formulas, $\gamma$ is the photothermal emission sensitivity of the fluorophore, $\Delta T_{ave}$ is the average temperature rise of an IR absorbing region of the sample (e.g., 102), $\tau_r$ is the thermal relaxation time of the sample absorbing region, $\tau_{IR}$ is the time between IR pulses, N is the number of hot/cold image pairs (see FIG. 3B), and C is the average number of photoelectrons per exposure by the camera (e.g., 122).

| CW Fluorescent Excitation | Pulsed, synchronized fluorescent excitation | Pulsed improvement factor |
|---|---|---|
| $\sigma_{coave} = \gamma \Delta T_{ave} \frac{\tau_r}{\tau_{IR}} \sqrt{\frac{NC}{2}}$ | $\sigma_{coave} = \gamma \Delta T_{max} \sqrt{\frac{NC}{2}}$ | ~20X |

Pulsed fluorescence excitation can achieve SNR benefits from two sources: (1) measuring the fluorescent emission at the peak sample temperature $\Delta T_{max}$, rather than at the average temperature rise $\Delta T_{ave}$; and (2) improving the SNR by avoiding the negative impact of the $\tau_r/\tau_{IR}$ term, which arises in the CW case due to the integration of photon shot noise during the period after the thermal relaxation when there is no photothermal signal.) FE-PTIR and AF-PTIR is typically performed at an IR laser repetition rate of 100 kHz, corresponding to $\tau_{IR}=10$ µs, whereas the typical thermal decay time is ~1 µs or less, so $\tau_r/\tau_{IR}<0.1$. Thus, utilizing pulsed fluorescent excitation removes the $\tau_r/\tau_{IR}$ term discount, providing >10× better SNR. The measurement at $\Delta T_{max}$ can provide up to ~2× further improvement over CW. Photobleaching will also be reduced by 10× as well since the sample will not be exposed to fluorescent excitation during dead time between IR pulses. Testing suggests this will be sufficient to acquire hyperspectral arrays with at least 4 cm$^{-1}$ spectral resolution with minimal bleaching of many common fluorophores and fluorescent proteins and endogenous Autofluorescence.

Figure 4B:
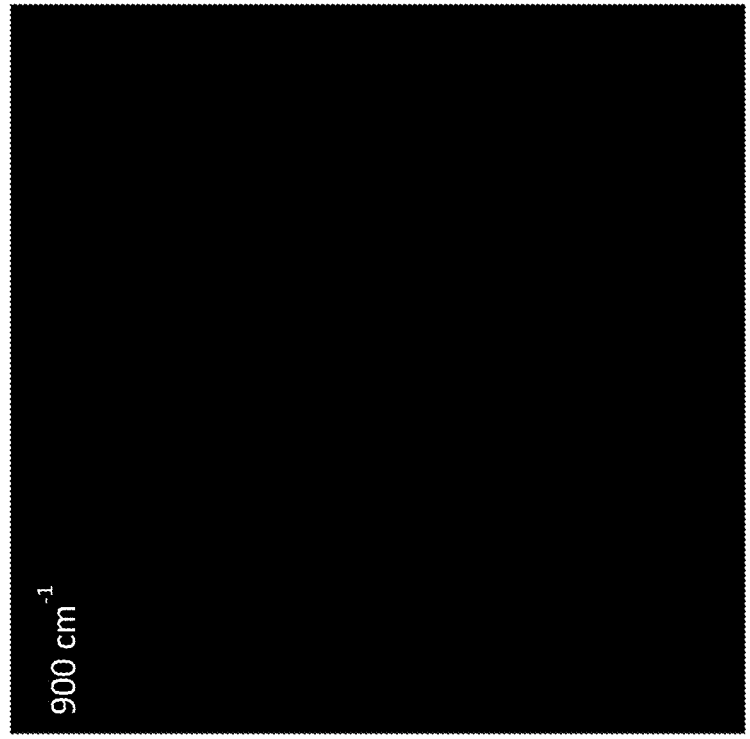
FIGS. 4A and 4B depict the effects of changing IR beam wavelength in a system like those described with respect to FIG. 1A-1.
Figure 4A:
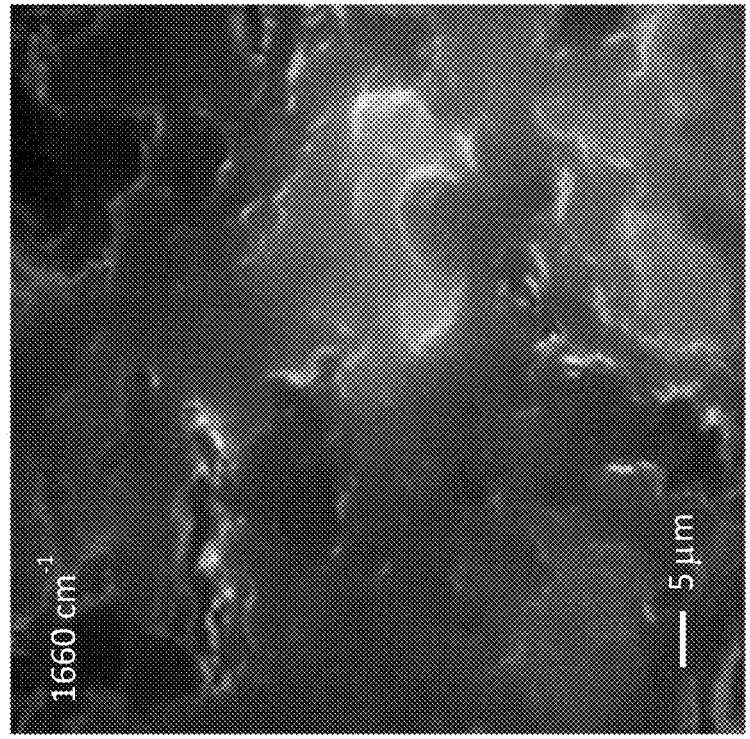

FIGS. 4A and 4B show an example AF-PTIR measurement on a sample of mouse brain tissue. Pairs of AF images were accumulated alternating with the IR beam off and on, i.e. successively alternating cold frames and hot frames as described with respect to FIGS. 3A and 3B. The exposure time per frame was 100 msec and 50 hot/cold image pairs were accumulated for a total measurement integration time of 10 seconds. The number of hot/cold image pairs can be as low as one or as high as required to achieve a desired signal to noise ratio. In practice usually 10-200 image pairs are acquired, thus requiring typically 2-40 seconds per photothermal IR absorption image. The image shown in FIGS. 4A and 4B below is 66.5 um across with 512×512 pixels and thus creating an IR absorption image with 262,144 locations on the sample being measured simultaneously in parallel.

In particular, FIG. 4A shows IR absorption at 1660 cm-1, which is the amide I absorption band corresponding to vibrational resonances in proteins. FIG. 4B shows an IR absorption image of the same sample but with the IR source tuned to 900 cm-1 where there is negligible absorption in biological tissue, thus resulting in an essentially blank image.

Figure 5B:
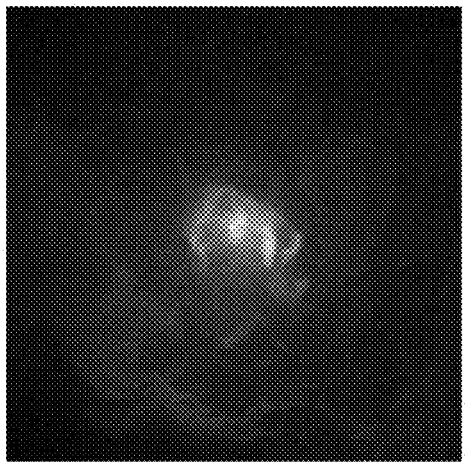
FIGS. 5A-5D show autofluorescence of a biological specimen as detected according to embodiments disclosed herein.
Figure 5D:
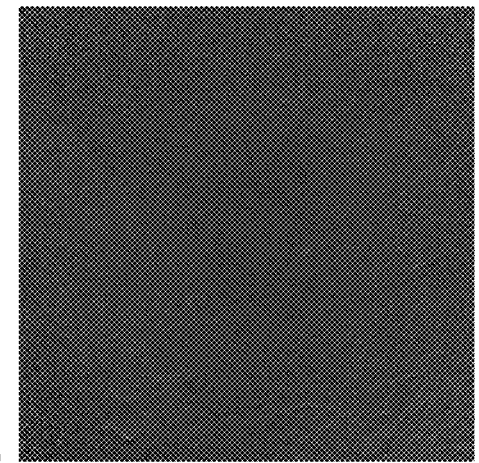
Figure 5A:
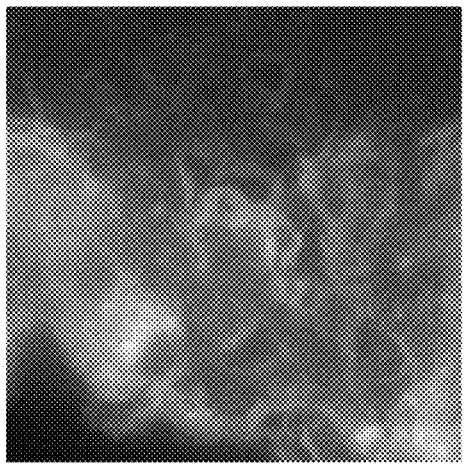
Figure 5C:

FIGS. 5A-5D show AF-PTIR imaging of mouse brain tissue. FIG. 5A shows an autofluorescence image of mouse brain tissue with excitation centered around 482 nm. FIG. 5B shows the same sample, illuminated for FE-PTIR IR absorption at 1656 cm-1, constructed by accumulating autofluorescence difference images between IR off and on. FIG. 5C shows the ratio of autofluorescence difference image at 1656 cm-1 between FIGS. 5A and 5B. The ratio normalizes for variations in autofluorescence intensity to provide a map of just IR absorption. The image depicted in FIG. 5C shows a brighter region in the center associated with the higher IR intensity at the center of the image. Taking the ratio of AF-PTIR/AF images at two different IR wavelengths can remove the impact of the variable intensity of the IR beam, essentially providing a flat-field correction. FIG. 5D shows a ratio of AF-PTIR/AF image at 1544 cm-1 (amide II band) to AF-PTIR/AF image at 1656 cm-1 (amide I band). In the case of this region of the sample, the amide II/amide II ratio is fairly constant, resulting in a mostly flat image.

Figure 6B:
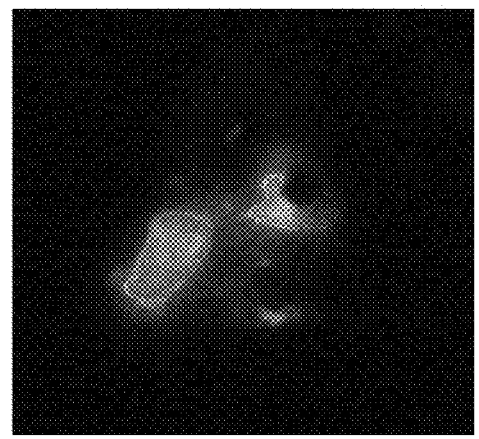
FIGS. 6A-6C show AF-PTIR IR absorption images on human stratum corneum at three different IR wavelengths.
Figure 6A:
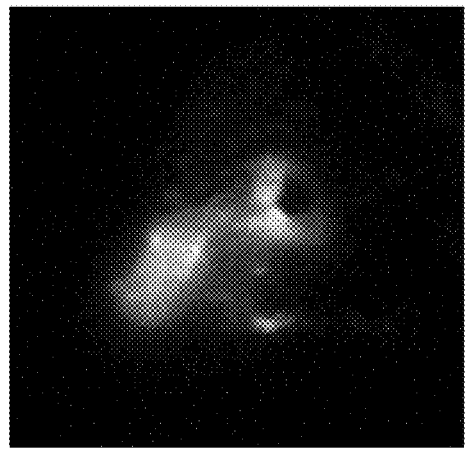
Figure 6C:
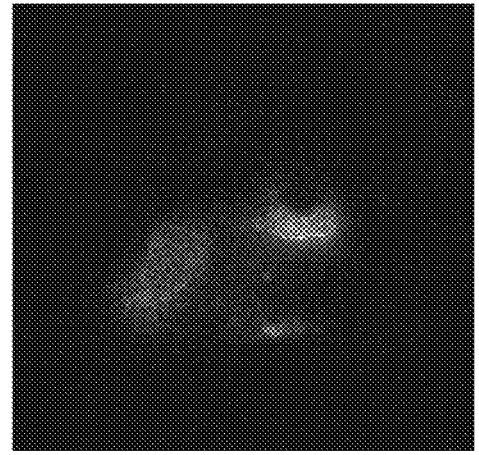
Figure 7B:
FIGS. 7A, 7B, 7C, and 7D show AF-PTIR IR absorption images on a sample of algae at four different IR wavelengths.
Figure 7A:
Figure 7D:
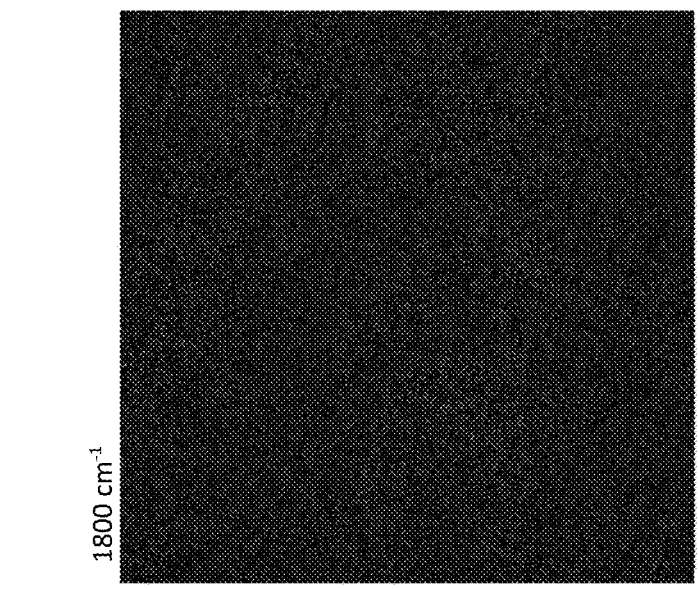
Figure 7C:

FIGS. 6A-6C show another sample, a human stratum corneum at three different excitation wavelengths. FIG. 6A shows the sample at 1658 cm$^{-1}$, FIG. 6B shows the sample at 1543 cm$^{-1}$, and FIG. 6C shows the sample at 1238 cm$^{-1}$.

FIG. 7 illustrates another measurement example, in this case AF-PTIR images of a sample of algae. The chlorophyll in the algae produces a strong autofluorescence signal that is highly temperature dependent and thus a strong indicator of IR absorption. Autofluorescence measurements on chlorophyll and chlorophyll containing plants provide insights into the photosynthetic process and also as an indicator of plant health, for example as described in "Imaging of Chlorophyll a Fluorescence in Natural Compound-Induced Stress Detection" by Sanchez-Moreiras et. al (Front. Plant Sci., 21 Dec. 2020, Sec. Technical Advances in Plant Science; https://doi:/10.3389/fpls.2020.583590) and "Autofluorescence in Plants" by L. Donaldson, (Molecules 2020, 25(10), 2393; https://doi.org/10.3390/molecules25102393), incorporated herein by reference. The AF-PTIR methods and apparatuses described herein may be of significant benefit to research into plants, natural photosynthetic materials and additionally materials under study for so called "artificial photosynthesis," i.e. biomimetic systems that artificially mimic aspects of natural photosynthesis for the purpose of light capture and energy storage/conversion. In each of these applications, the AF-PTIR instrument provides measurements of autofluorescence with benefits outlined in the articles above, along with simultaneous and co-located measurements of IR absorption, which provides additional complementary information about the chemical structure of the sample.

FIGS. 7A-7D show AF-PTIR IR absorption images on the algae sample at four example IR wavelengths. Note how the contrast decreases at 1800 cm-1 where the IR source has minimal power and the sample has lower absorption. For these measurements, the autofluorescence excited with a center wavelength of 628±20 nm and autofluorescence detection with a center wavelength of 692±20 nm. Photothermal IR images were obtained by aggregating the difference between hot and cold images (that is, "hot" frames in which an IR pulse train is delivered to the sample vs. "cold" frames in which no such IR pulse train is delivered to the sample). For the images shown in FIG. 7, 50 image pairs were collected for each wavelength, with an integration time of 100 msec per image. For strong autofluorescence it is possible to achieve acceptable IR images with as little as one hot/cold image pair, which can be acquired in some embodiments using IR image acquisition times as little as 200 msec using existing s-CMOS camera and LED illuminator fluorescent excitation technology. These images were 512×512 pixels and 65.6 um across, giving a pixel resolution of 0.13 um. The measurements that resulted in the image of FIG. 7 were performed with a 50×0.8 NA refractive objective for fluorescent excitation/collection and a 25 mm focal length zinc selenide lens (ZnSe) from below to focus the IR light.

The ZnSe lens was operated a few hundred microns away from best focus to provide more uniform IR illumination over the >50 micron field of view.

Figure 8:
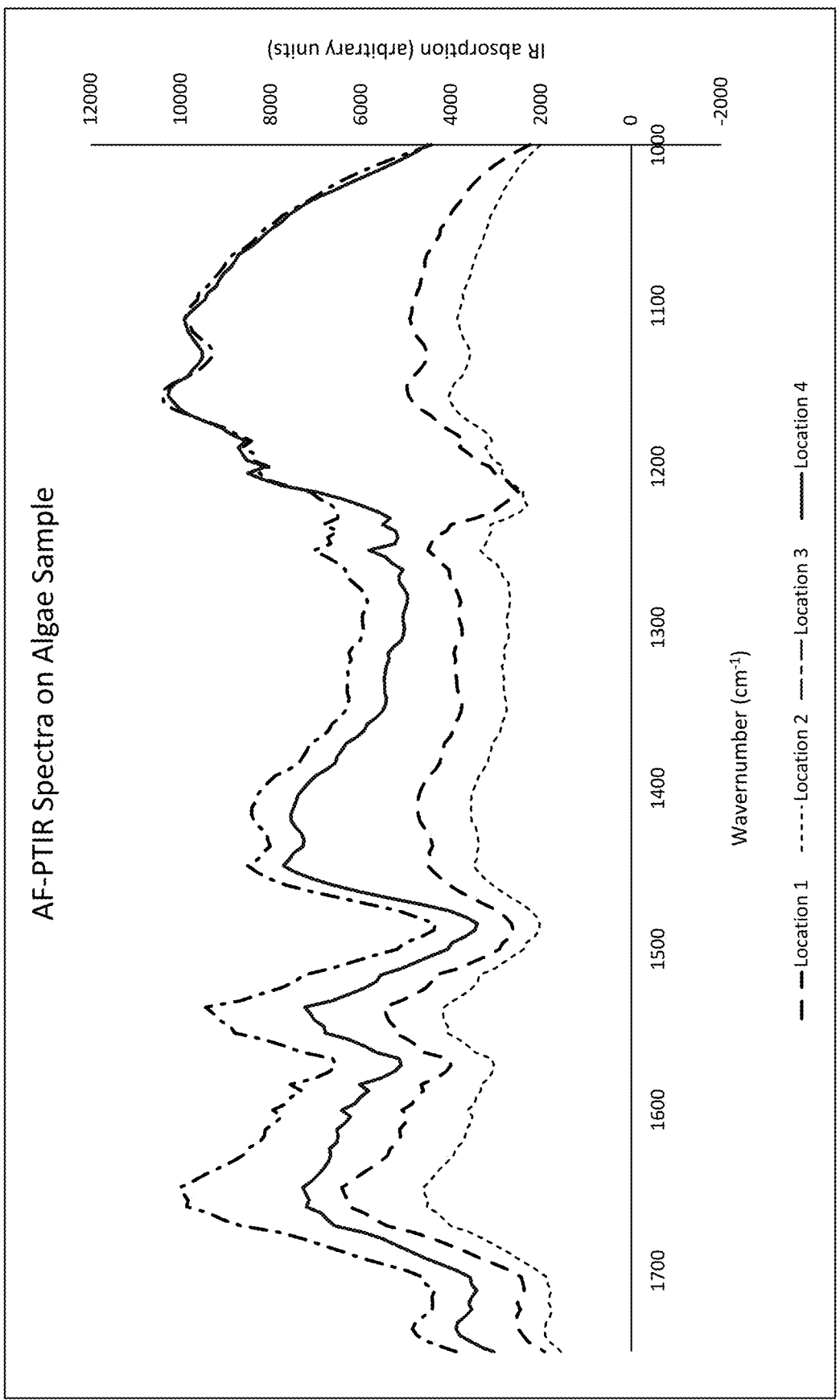
FIG. 8 shows AF-PTIR absorption spectra extracted from a sequence of AF-PTIR IR absorption images at four different regions on a sample of algae.

FIG. 8 illustrates extracting IR absorption spectra from a hyperspectral stack of AF-PTIR images at a plurality of IR wavelengths. AF-PTIR IR absorption images were acquired at each wavenumber from 1000-1800 cm-1 with a spacing of 4 cm-1. The strength of the IR absorption was then plotted for this wavenumber range for four different regions of interest on an algae sample. The size of the region of interest can be varied to achieve an acceptable tradeoff between resolution and signal to noise ratio. The spectra were also corrected for sample any bleaching and/or variation in the excitation intensity by ratioing the spectra to an independent measurement of the DC autofluorescence at each pixel and wavenumber. For these measurements hot/colt image pairs were used per wavenumber with an image integration time of 100 msec, i.e., a total acquisition time per IR absorption image of 2 seconds.

One thing to note in FIGS. 4-7 is the absence of any coherent interference artifacts. This is due to the fact that the autofluorescence emission occurs at a wavelength that is different than the excitation wavelength, so it is not possible for the emission radiation to coherently interfere with primary or secondary reflections of the excitation wavelength.

As will be understood from Applicant's previous work as described above and incorporated by reference, such as U.S. Pat. No. 10,942,116 B2 at FIG. 21, different excitation wavelengths could be used and layered to create hyperspectral images.

Furthermore, the detection of specific materials in a sample as described herein can be targeted to specific areas by constructing IR absorption spectra from regions of interest in AF-PTIR images.

Additionally, improved image stacking can be performed by stacking images over a range of excitation wavelengths.

The following Examples describe embodiments that are within the scope of the invention.

EXAMPLES

Example 1

An apparatus for performing infrared imaging of a sample is described herein that includes a tunable autofluorescent excitation source used in the manner described above. The infrared source described in Example 1 is modulated, which can mean either that a pulsed source is used (i.e., the light source itself creates a periodic pulse) or that the beam coming from the source is modulated (i.e., the light source is constant, or pulsed at a slower rate, and an external device such as a chopper is used to create the desired periodicity and wave shape).

The apparatus of Example 1 comprises:
a tunable excitation radiation source configured to illuminate a region of the sample with a beam of excitation radiation to excite autofluorescent emission in the sample;
a detector configured to capture at least a portion of the autofluorescent emission from the sample and produce a first frame autofluorescent image of the region of the sample;
a modulated infrared source configured to illuminate the region of the sample with an infrared beam to create an infrared illuminated region of the sample;
the detector configured to capture at least a portion of the autofluorescent emission from the infrared illuminated region of the sample and produce a second frame autofluorescent image of the region of the sample; and
a processor configured to construct a signal indicative of infrared absorption of the region of the image using the first frame autofluorescent image of the region of the sample and the second frame autofluorescent image of the region of the sample.

In embodiments, the tunable excitation radiation source in Example 1 can be configured to operate within a range between about 400 nm and about 700 nm.

In embodiments, the tunable excitation source in Example 1 can be configured to generate light at multiple wavelengths within the range, the apparatus further comprising a bandpass filter configured to selectively admit a narrower range of wavelengths within the range.

Example 2

An apparatus for performing infrared imaging of a sample is described with respect to Example 2, in which the detection is done by point rather than as a widefield detection method. The point-based system is shown, for example, in FIGS. 1B-1F. The apparatus of Example 2 comprises:
a modulated radiation source configured to illuminate a region of the sample with a pulsed beam of excitation radiation to excite autofluorescent emission in the sample;
a detector configured to capture at least a portion of the autofluorescent emission from the sample and produce a first frame autofluorescent image of the region of the sample;
a modulated infrared source configured to illuminate an infrared illuminated region of the sample that includes the point region of the sample with a pulsed infrared beam;
a detector configured to capture at least a portion of the autofluorescent emission from the point region of the sample and produce a second frame autofluorescent image of the point region of the sample; and
a processor configured to construct a signal indicative of infrared absorption of the sample by combining a plurality of sets of first and second frames at different point regions across the sample.

While not separately listed and described herein, the skilled artisan would be aware of various modifications to this system, including the examples described above with respect to the widefield measurements apparatus of Example 1.

Example 3

An apparatus for performing infrared imaging of a sample is described with respect to Example 3, which (like Example 2) relates to a point-by-point detection system, rather than a widefield detection system. The apparatus of Example 3 includes a tunable excitation source, such that detection of autofluorescence of a various compounds or materials within a single sample can be detected using the same tunable source. The apparatus of Example 3 comprises:
a tunable excitation radiation source configured to illuminate a point region of the sample with a beam of excitation radiation to excite autofluorescent emission in the sample;
a detector configured to capture at least a portion of the autofluorescent emission from the sample and produce a first frame autofluorescent image of the point region of the sample;

a modulated infrared source configured to illuminate an infrared illuminated region of the sample including the point region of the sample;

the detector configured to capture at least a portion of the autofluorescent emission from the infrared point region of the sample and produce a second frame autofluorescent image of the point region of the sample; and a processor configured to construct a signal indicative of infrared absorption of the sample by combining a plurality of sets of first and second frames at different point regions across the sample.

While not separately listed and described herein, the skilled artisan would be aware of various modifications to this system, including the examples described above with respect to the widefield measurements apparatus of Example 1.

Example 4

An method for performing infrared imaging of a sample is described in Example 4, which describes what occurs within a particular sample according to an embodiment of the invention. In Example 4, the method includes:

illuminating a region of a sample using a radiation source with a modulated beam of excitation radiation to excite autofluorescent emission in the sample; then collecting, as a cold frame sample, light from the sample indicative of autofluorescent emission without infrared heating;

illuminating the region of the sample with an infrared source; then collecting, as a hot frame sample, light from the sample indicative of autofluorescent emission after undergoing infrared heating; and constructing a signal indicative of infrared absorption of the region of the sample by comparing the cold frame sample and the hot frame sample.

In embodiments, the target class comprises at least one material selected from the group consisting of: NAD(P)H bound, NAD(P)H free, fatty acids, vitamins, flavins, proteins, chlorophyll or other biological materials that convert light to energy, and porphyrins.

In embodiments, using a radiation source to generate a modulated beam of excitation radiation to excite autofluorescent emission in the sample comprises tuning a tunable excitation radiation source to a wavelength substantially maximizing transmission of a peak amplitude of an emission spectrum of the sample.

Substantially maximizing the transmission of an peak amplitude of an emission spectrum of the sample can comprise using a band pass filter substantially aligned to the center of a local emission peak of a substance within the sample. Alternatively, as shown in FIG. 2, the selection of wavelength using a tunable source (or the use of a band-pass filter) can be used to measure at least slightly off-peak from the maximum of a particular material, in order to increase the portion or quality of the signal from the substance of interest relative to other signals that are not of interest, or noise.

The output measured in Example 4 can be indicative of infrared absorption of the sample in an area overlapping the first region and the second region.

The first dataset and the second dataset can each separately comprise an image, an array, or another mapping of absorption or autofluorescent emission to location on the sample.

Example 5

According to a fifth example, a method comprises leaving the region of the sample un-illuminated for a period of time based upon the thermal relaxation time of the sample between pulses of the excitation radiation. —Autoemission data is collected at a first infrared wavelength, and the method repeats at a second wavelength, and a ratio at each point in the image is calculated to remove artifacts from the IR beam strength or autofluorescent emission variations.

It should be understood that this method is compatible with the other methods or apparatuses described above, and can be conducted as a calibration step in some embodiments. This calibration can eliminate effects of scattering or reflection due to sample parameters, which is especially prevalent in biological materials that are not always flat and may have various indices of refraction throughout.

Example 6

According to Example 6, a method is disclosed for performing infrared imaging of a sample, including calculating a ratio as described in Example 5, to remove artifacts due to the IR beam strength or autofluorescent emission variation. The method of Example 6 comprises:

(a) illuminating a region of a sample using a radiation source with a beam of excitation radiation at a first wavelength to excite autofluorescent emission corresponding to a first expected material in the sample;

(b) collecting, as a cold frame sample, light from the sample indicative of autofluorescent emission without infrared heating;

(c) illuminating the region of the sample with an infrared source; then (d) collecting, as a hot frame sample, light from the sample indicative of autofluorescent emission after undergoing infrared heating;

(e) comparing the hot frame sample and the cold frame sample to identify the location of the first expected material in the region of the sample;

(f) repeating (a) through (e) at a second wavelength to excite autofluorescent emission corresponding to a second expected material in the sample; and (g) calculating a ratio between the identified locations of the first and second expected materials at each point in the image to remove artifacts from the IR beam strength or autofluorescent emission variations.

Other Variations and Alternatives

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events described herein can be performed concurrently, rather than sequentially.

The various illustrative logical blocks, optical and control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim. While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A method for performing infrared imaging of a sample, the method comprising:
    illuminating a first region of the sample with an infrared source that generates a modulated infrared beam;
    illuminating the sample with a beam of excitation radiation to excite autofluorescent emission in a second region at least partially overlapping the first region;
    detecting at least a portion of the autofluorescent emission from the second region by at least one array-based detector as detected autofluorescent emission;
    producing a first frame autofluorescent dataset of the second region using the detected autofluorescent emission of the sample with a first value of infrared beam energy;
    producing a second frame autofluorescent dataset of the second region using the detected autofluorescent emission at a second value of infrared beam energy; and
    constructing an output indicative of infrared absorption of the sample using the first frame autofluorescent dataset and the second frame autofluorescent dataset.

2. The method of claim 1, wherein detecting the detected autofluorescent emission comprises detecting a target class selected from the group consisting of: NAD(P)H bound, NAD(P)H free, fatty acids, vitamins, flavins, proteins, porphyrins, and chlorophyll.

3. The method of claim 1, wherein constructing the output comprises substantially maximizing transmission of a peak amplitude of an autofluorescent emission spectrum of the sample.

4. The method of claim 3, wherein substantially maximizing the transmission of the peak amplitude of the autofluorescent emission spectrum of the sample comprises using a band pass filter substantially aligned to a center of a local emission peak of a substance within the sample.

5. The method of claim 1, wherein filtering the light comprises transmitting light at a wavelength where autofluorescent emissions from a first substance within the sample are substantially larger than autofluorescent emissions from a second substance within the sample, and wherein the wavelength at which the light is transmitted is not a local peak amplitude of an emission spectrum of the first substance.

6. The method of claim 1, wherein the output is indicative of infrared absorption of the sample in an area overlapping the first region and the second region.

7. The method of claim 1, wherein the first frame autofluorescent dataset and the second frame autofluorescent dataset each separately comprise an image, an array, or another mapping of absorption or the autofluorescent emission to location on the sample.

8. An apparatus for performing infrared imaging of a sample, the apparatus comprising:
an excitation radiation source configured to illuminate a region of the sample with a beam of excitation radiation to excite autofluorescent emission in the sample;
a modulated infrared source configured to illuminate the region of the sample with a modulated infrared beam to create an infrared illuminated region of the sample;
at least one array-based detector configured to capture at least a portion of the autofluorescent emission from the infrared illuminated region of the sample and produce a first frame autofluorescent image of the region of the sample with a first value of infrared beam energy and produce a second frame autofluorescent image of the infrared illuminated region of the sample at a second value of infrared beam energy; and
a processor configured to construct a signal indicative of infrared absorption of the region of the sample using the first frame autofluorescent image and the second frame autofluorescent image.

9. The apparatus of claim 8, further comprising a stage configured to hold the sample.

10. The apparatus of claim 9, wherein the stage is movable relative to at least one of the modulated infrared beam and the beam of excitation radiation.

11. The apparatus of claim 8, wherein the modulated infrared source is a pulsed infrared source configured to generate the modulated infrared beam.

12. The apparatus of claim 8, wherein the modulated infrared source is a continuous wave source paired with a chopper to generate the modulated infrared beam.

13. The apparatus of claim 8 wherein the excitation radiation source is modulated.

14. The apparatus of claim 8, further comprising at least one pulse generator operationally coupled to the modulated infrared source and the excitation radiation source, wherein the at least one pulse generator is configured to control a timing of the modulated infrared source and the excitation radiation source at an adjustable delay.

15. The apparatus of claim 14, wherein the processor is configured to construct the signal indicative of infrared absorption of the region by controlling the array-based detector to obtain the first frame autofluorescent image and the second frame autofluorescent image based upon the timing of the modulated infrared source and the excitation radiation source.

16. The apparatus of claim 8, further comprising an infrared objective configured to receive the modulated infrared beam and focus it on the region of the sample.

17. The apparatus of claim 8, further comprising an excitation beam objective configured to receive the beam of excitation radiation and focus it on the region of the sample, and further configured to receive the autofluorescent emission from the sample and route the received autofluorescent emission towards the array-based detector.

18. The apparatus of claim 17, further comprising a dichroic mirror arranged between the excitation beam objective and the array-based detector, wherein the dichroic mirror is selected to:
reflect a majority of light having a wavelength of the beam of excitation radiation; and
transmit the majority of light having a wavelength of the autofluorescent emission.

19. The apparatus of claim 17, further comprising an autofluorescence filter arranged between the excitation beam objective and the array-based detector.

20. The apparatus of claim 19, wherein the autofluorescence filter is a long-pass filter.

21. The apparatus of claim 8, wherein the processor is configured to construct the signal indicative of infrared absorption of the region by detecting fluorescence at a variety of wavelengths each corresponding to a respective autofluorescent wavelength of a substance.

22. The apparatus of claim 8 wherein at least one of the first value of infrared beam energy or the second value of infrared beam energy is substantially zero.

23. The apparatus of claim 8 wherein the excitation radiation source comprises at least one light emitting diode.

24. The apparatus of claim 23 in which the at least one light emitting diode emits excitation radiation at at least one wavelength within a range of 250-400 nm.

25. The apparatus of claim 24 wherein the at least one light emitting diode is pulsed.

26. The apparatus of claim 25 wherein the at least one light emitting diode is pulsed with a pulse duration in the range of 100 nanoseconds to 100 microseconds.

27. The apparatus of claim 8 wherein the at least one array-based detector is configured to detect an autofluorescent response of chlorophyll or other organic photosynthetic material or artificial photosynthetic material.

* * * * *